United States Patent
Mohaban et al.

(10) Patent No.: US 6,463,470 B1
(45) Date of Patent: Oct. 8, 2002

(54) METHOD AND APPARATUS OF STORING POLICIES FOR POLICY-BASED MANAGEMENT OF QUALITY OF SERVICE TREATMENTS OF NETWORK DATA TRAFFIC FLOWS

(75) Inventors: Shai Mohaban, Sunnyvale; Itzhak Parnafes, Cupertino, both of CA (US); Yoram Ramberg, Tel-Aviv; Yoram Snir, Moshav Bet Hananya, both of (IL); John Strassner, Fairfield, CA (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 09/376,802

(22) Filed: Aug. 18, 1999

Related U.S. Application Data

(63) Continuation-in-part of application No. 09/206,067, filed on Dec. 4, 1998, now Pat. No. 6,286,052, and a continuation-in-part of application No. 09/179,036, filed on Oct. 26, 1998, now Pat. No. 6,167,445.

(51) Int. Cl.[7] .............................................. G06F 13/00
(52) U.S. Cl. ........................................ 709/223; 709/224
(58) Field of Search ................................ 709/200, 201, 709/203, 217, 218, 219, 220, 221, 222, 223, 224

(56) References Cited

U.S. PATENT DOCUMENTS

| | | | | |
|---|---|---|---|---|
| 5,970,064 A | * | 10/1999 | Clark et al. ................. | 370/351 |
| 6,104,700 A | * | 8/2000 | Haddock et al. ............ | 370/235 |
| 6,169,748 B1 | * | 1/2001 | Barbas et al. ................ | 370/468 |
| 6,301,613 B1 | * | 10/2001 | Ahlstrom et al. ........... | 709/223 |
| 6,327,618 B1 | * | 12/2001 | Ahlstrom et al. ........... | 709/223 |

* cited by examiner

Primary Examiner—Moustafa M. Meky
(74) Attorney, Agent, or Firm—Hickman Palermo Truong & Becker LLP

(57) ABSTRACT

A method and apparatus for storing policies for use in policy-based management of quality of service treatments of network data traffic flows are described. The policies are stored in the form of policy statements. Each policy statement applies to a specific application that runs in the network. Each policy statement includes a condition and a network service to be applied to all traffic matching the condition. Each condition comprises one or more basic condition components connected by operators. Each basic condition comprises a basic policy parameter identifier, an operator and an operand. Policy statements are stored in a Repository, which may be a Directory Server or an X.500 directory. A policy server may create and store policies in the Repository based on information about the application, the network devices, and the quality of service treatments that the network devices can apply to a traffic flow. An application program and the policy server network device can retrieve the policy information from the Repository using appropriate function calls or an access protocol such as LDAP. In an alternative embodiment, a complete quality of service directory schema for representing abstract policies is disclosed.

29 Claims, 16 Drawing Sheets

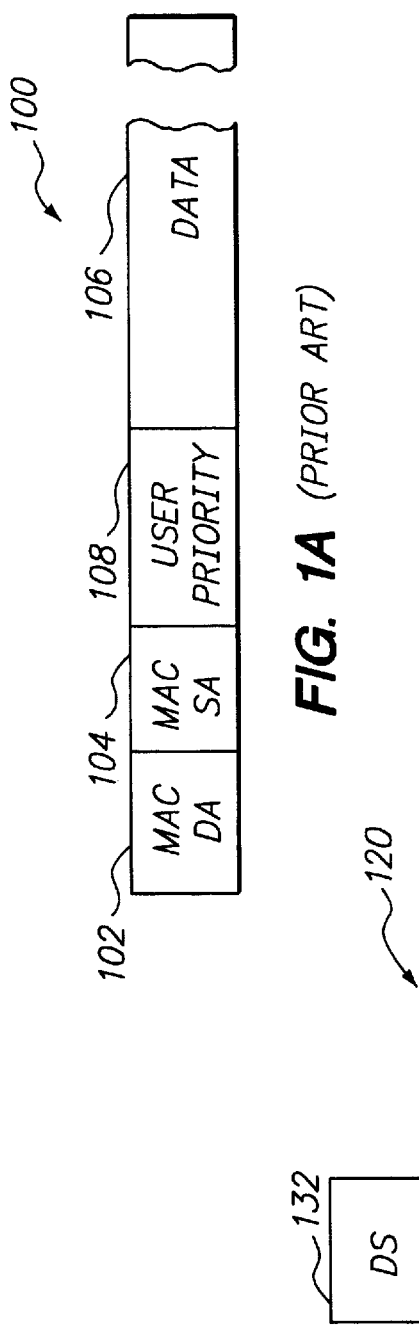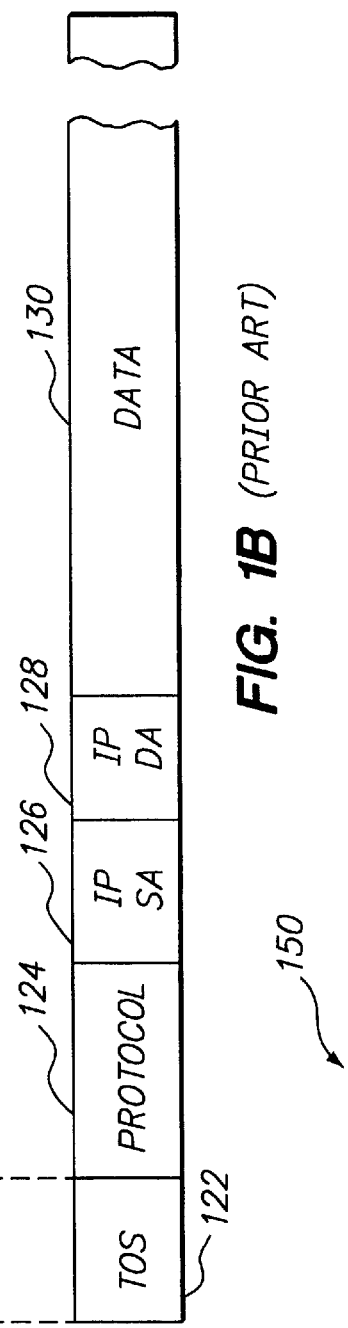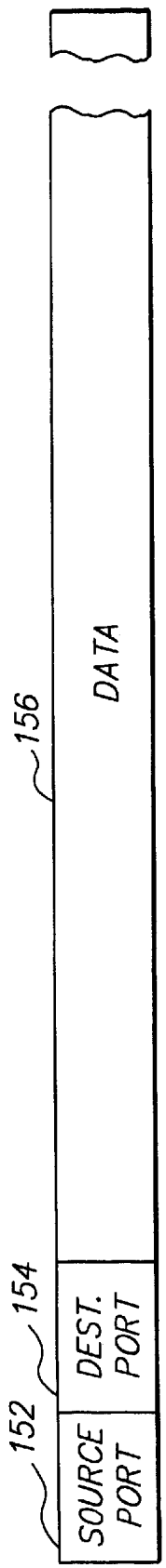
FIG. 1A (PRIOR ART)
FIG. 1B (PRIOR ART)
FIG. 1C (PRIOR ART)

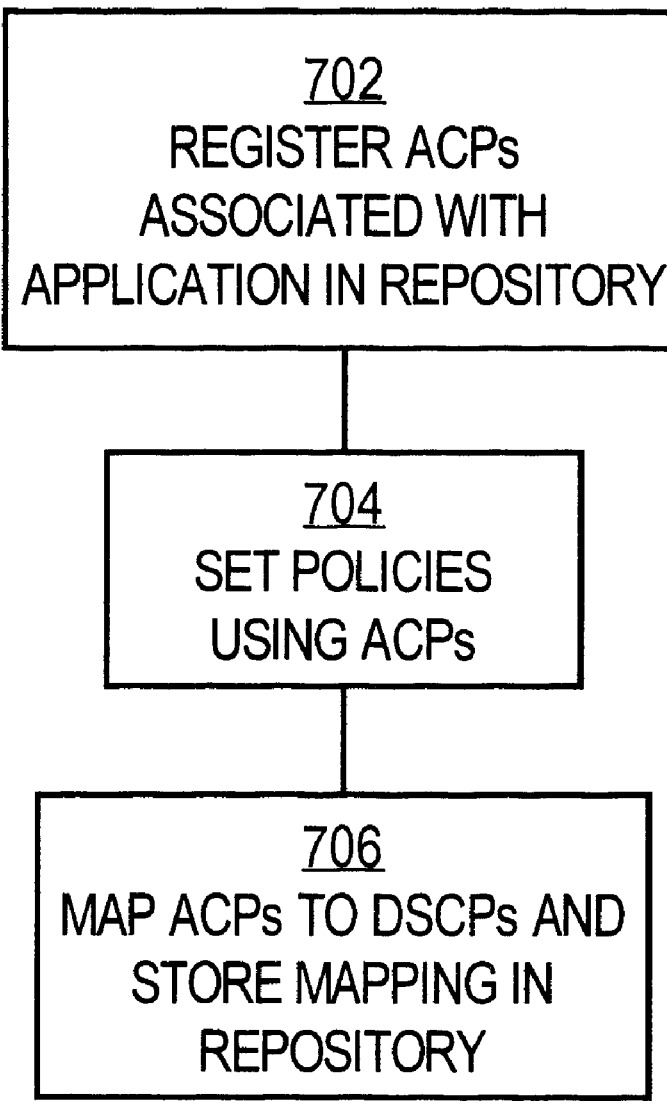

METHOD AND APPARATUS OF STORING POLICIES FOR POLICY-BASED MANAGEMENT OF QUALITY OF SERVICE TREATMENTS OF NETWORK DATA TRAFFIC FLOWS

RELATED APPLICATIONS

This application is a continuation-in-part of prior, co-pending application Ser. No. 09/179,036, now U.S. Pat. No. 6,167,052, filed Oct. 26, 1998, entitled "Method and apparatus for defining and implementing high-level quality of service policies in computer networks," and is also a continuation-in-part of Ser. No. 09/206,067, now U.S. Pat. No. 6,286,052 filed Dec. 4, 1998, entitled "Method and apparatus for identifying network data traffic flows and for applying quality of service treatments to the flows," the entire disclosures of which are hereby incorporated by reference as if fully set forth herein.

FIELD OF THE INVENTION

The present invention relates generally to computer networks, and more specifically, to a method and apparatus for storing policies for policy-based management of quality of service treatments of network data traffic flows.

BACKGROUND OF THE INVENTION

A computer network typically comprises a plurality of interconnected entities that transmit ("source") or receive ("sink") data frames. A common type of computer network is a local area network ("LAN") that generally comprises a privately owned network within a single building or campus. LANs employ a data communication protocol (LAN standard) such as Ethernet, FDDI, or Token Ring, that defines the functions performed by the data link and physical layers of a communications architecture (i.e., a protocol stack), such as the Open Systems Interconnection (OSI) Reference Model. In many instances, multiple LANs may be interconnected by point-to-point links, microwave transceivers, satellite hookups, etc., to form a wide area network ("WAN"), metropolitan area network ("MAN") or Intranet. These internetworks may be coupled through one or more gateways to the global, packet-switched internetworks knows as Internet.

Each network entity preferably includes network communication software, which may operate in accordance with Transport Control Protocol/Internet Protocol (TCP/IP). TCP/IP generally consists of a set of rules defining how entities interact with each other. In particular, TCP/IP defines a series of communication layers, including a transport layer and a network layer. At the transport layer, TCP/IP includes both the User Data Protocol (UDP), which is a connection-less transport protocol, and TCP which is a reliable, connection-oriented transport protocol. When a process at one network entity wishes to communicate with another entity, it formulates one or more messages and passes them to the upper layer of the TCP/IP communication stack. These messages are passed down through each layer of the stack where they are encapsulated into packets and frames. Each layer also adds information in the form of a header to the messages. The frames are then transmitted over the network links as bits. At the destination entity, the bits are reassembled and passed up the layers of the destination entity's communication stack. At each layer, the corresponding message headers are also stripped off, thereby recovering the original message which is handed to the receiving process.

One or more intermediate network devices are often used to couple LANs together and allow the corresponding entities to exchange information. For example, a bridge may be used to provide a "bridging" function between two or more LANs. Alternatively, a switch may be utilized to provide a "switching" function for transferring information, such as data frames or packets, among entities of a computer network. Typically, the switch is a computer having a plurality of ports that couple the switch to several LANs and to other switches. The switching function includes receiving data frames at a source port and transferring them to at least one destination port for receipt by another entity. Switches may operate at various levels of the communication stack. For example, a switch may operate at Layer 2 which, in the OSI Reference Model, is called the data link layer, and includes the Logical Link Control (LLC) and Media Access Control (MAC) sub-layers.

Other intermediate devices, commonly known as routers, may operate at higher communication layers, such as Layer 3, which in TCP/IP networks corresponds to the Internet Protocol (IP) layer. IP data packets include a corresponding header which contains an IP source address and an IP destination address. Routers or Layer 3 switches may re-assemble or convert received data frames from one LAN standard (e.g., Ethernet) to another (e.g., Token Ring). Thus, Layer 3 devices are often used to interconnect dissimilar subnetworks. Some Layer 3 intermediate network devices may also examine the transport layer headers of received messages to identify the corresponding TCP or UDP port numbers being utilized by the corresponding network entities. Many applications are assigned specific, fixed TCP and/or UDP port numbers in accordance with Request For Comments (RFC) 1700. For example, TCP/UDP port number 80 corresponds to the Hypertext Transport Protocol (HTTP), while port number 21 corresponds to File Transfer Protocol (FTP) service.

ALLOCATION OF NETWORK RESOURCES

Computer networks include numerous services and resources for use in moving traffic throughout the network. For example, different network links, such as Fast Ethernet, Asynchronous Transfer Mode (ATM) channels, network tunnels, satellite links, etc., offer unique speed and bandwidth capabilities. Particular intermediate devices also include specific resources or services, such as number of priority queues, filter settings, availability of different queue selection strategies, congestion control algorithms, etc.

Individual frames or packets can be marked so that intermediate devices may treat them in a predetermined manner. For example, the Institute of Electrical and Electronics Engineers (IEEE) describes additional information for the MAC header of Data Link Layer frames in Appendix 802.1p to the 802.1D bridge standard.

FIG. 1A is a partial block diagram of a Data Link frame 100 that includes a MAC destination address (DA) field 102, a MAC source address (SA) field 104 and a data field 106. According to the 802.1Q standard, a user_priority field 108, among others, is inserted after the MAC SA field 104. The user_priority field 108 may be loaded with a predetermined value (e.g., 0–7) that is associated with a particular treatment, such as background, best effort, excellent effort, etc. Network devices, upon examining the user_priority field 108 of received Data Link frames 100, apply the corresponding treatment to the frames. For example, an intermediate device may have a plurality of transmission priority queues per port, and may assign frames to different queues of a destination port on the basis of the frame's user priority value.

FIG. 1B is a partial block diagram of a Network Layer packet 120 corresponding to the Internet Protocol. Packet 120 includes a type_of_service (ToS) field 122, a protocol field 124, an IP source address (SA) field 126, an IP destination address (DA) field 128 and a data field 130. The ToS field 122 is used to specify a particular service to be applied to the packet 120, such as high reliability, fast delivery, accurate delivery, etc., and comprises a number of sub-fields. The sub-fields may include a 3-bit IP precedence (IPP) field and three one-bit flags that signify Delay, Throughput, and Reliability. By setting the flags, a device may indicate whether delay, throughput, or reliability is most important for the traffic associated with the packet. Version 6 of the Internet Protocol (Ipv6) defines a traffic class field, which is also intended to be used for defining the type of service to be applied to the associated packet.

A working group of the Internet Engineering Task Force (IETF) has proposed replacing the ToS field 122 of Network Layer packets 120 with a one-octet differentiated services (DS) field 132 that can be loaded with a differentiated services codepoint. Layer 3 devices that are DS compliant apply a particular per-hop forwarding behavior to data packets based on the contents of their DS fields 132. Examples of per-hop forwarding behaviors include expedited forwarding and assured forwarding. The DS field 132 is typically loaded by DS compliant intermediate devices located at the border of a DS domain, which is a set of DS compliant intermediate devices under common network administration. Thereafter, interior DS compliant devices along the path apply the corresponding forwarding behavior to the packet 120.

FIG. 1C is a partial block diagram of a Transport Layer packet 150 that preferably includes a source port field 152, a destination port field 154, and a data field 156, among others. Fields 152, 154 preferably are loaded with the TCP or UDP port numbers that are utilized by corresponding network entities.

SERVICE LEVEL AGREEMENTS

To interconnect dispersed computer networks, many organizations rely on the infrastructure and facilities of Internet Service Providers (ISPs). For example, an organization may lease one or more T1 lines to interconnect various LANs. Each organization enters into a service-level agreement with its ISP. The service level agreements include one or more traffic specifications. The traffic specifications may place limits on the amount of resources that the organization may consume for a given price.

For example, an organization may agree not to send traffic that exceeds a certain bandwidth, e.g., 1 Mb/s. Traffic entering the service provider's network is monitored to ensure that it complies with the relevant traffic specifications and is thus "in profile." Traffic that exceeds a traffic specification, and is therefore "out of profile" may be dropped or shaped or may cause an accounting change. Alternatively, the service provider may mark the traffic as exceeding the traffic specification, but allow it to proceed through the network anyway. If there is congestion, an intermediate network device may drop such marked traffic first in an effort to relieve the congestion.

MULTIPLE TRAFFIC FLOWS

A process executing at a network entity may generate hundreds or thousands of traffic flows that are transmitted across a network. Generally, a traffic flow is a set of messages (frames and/or packets) that typically correspond to a particular task, transaction or operation (e.g., a print transaction) and may be identified by various network and transport parameters, such as source and destination IP addresses, source and destination TCP/UDP port numbers, and transport protocol.

The treatment that is applied to different traffic flows may vary depending on the particular traffic flow at issue. For example, an online trading application may generate stock quote messages, stock transaction messages, transaction status messages, corporate financial information messages, print messages, data backup messages, etc. A network administrator may wish to apply a different policy or service treatment ("quality of service" or "QoS") to each traffic flow. In particular, the network administrator may want a stock quote message to be given higher priority than a print transaction. Similarly, a $1 million stock transaction message for a premium client should be assigned higher priority than a $100 stock transaction message for a standard customer.

DEFICIENCIES OF PAST APPROACHES

Currently, application programs that execute in network devices rarely invoke QoS functions, and therefore they do not take full advantage of QoS features that are available in the network devices.

Some intermediate network devices can distinguish among multiple traffic flows and can apply different QoS to the flows. Generally, QoS may be applied by such network devices based on the IP address or port number associated with a traffic flow. This approach has several advantages. It is centralized, it works with multiple applications, and it is application independent. However, there are also significant disadvantages. It is based on limited or no knowledge of application traffic flows. A network manager cannot define and apply QoS policies for individual applications. It has only limited applicability to encrypted packets.

In another known approach, applications use QoS signaling mechanisms, such as RSVP or differentiated services ("DS" or "DiffServ"), to request a particular QoS for a particular traffic flow. In RSVP, a traffic flow passes a request for service that includes additional information to help a network device how to apply QoS. This approach can take advantage of detailed knowledge of different traffic flows produced by an application. However, there is no way to determine whether the RSVP requests comply with network-wide policies. The result is that the devices are often configured to ignore the signaling and treat all traffic equally.

Still another approach is IP precedence, in which a value is placed in a sub-field of the IP Type of Service field. This provides even less granular QoS control than DS.

Thus, current approaches do not adequately extend network device QoS features to multiple applications. These approaches do not integrate the application into the network and do not enable the application to classify its flows according to application-specific information. Further, there is no way to track applications that use dynamic port numbers, such as FTP.

Thus, there is a need for a mechanism that integrates applications into a policy-based networking system, and enables applications to participate in deciding how to apply a particular QoS to a traffic flow generated by the application.

Still another problem relates to how policies are defined. A typical business enterprise has separate individuals who are responsible for management of the enterprise's network and for installation and maintenance of application programs that run in or use the network. These individuals normally have greatly differing areas of knowledge and expertise. The network manager generally knows the configuration of the network in intimate detail and knows, or can determine, which network devices support various QoS services. However, the network manager generally does not know details about traffic flows that are generated by the application programs. In contrast, the application manager typically has extensive knowledge about the application programs and the kinds of traffic they generate, but less knowledge about the network, its devices, and their QoS capabilities. Accordingly, there is a need for a way to create network QoS policies that incorporate these respective bodies of knowledge in an orderly and integrated manner.

Another problem in this field is storage and representation of policies that are used to determine QoS treatment of traffic flows. In past approaches, policies have been stored in an arbitrary manner, often outside the network, often in awkward and inconvenient form. For example, some network management policies exist only in mental form in the memories of network managers. Other policies are written but not stored in machine-usable form. As a result, QoS policies may conflict with other network management policies.

Recent work has begun to address some of these problems. For example, see J. Strassner, E. Ellesson, B. Moore, "Policy Framework Core Information Model", draft-ietf-policy-core-info-model-00.txt; J. Strassner, E. Ellesson, B. Moore, "Policy Framework LDAP Core Schema", draft-ietf-policy-core-schema-04.txt; J. Strassner, E. Ellesson, "Terminology for describing network policy and services", draft-ietf-policy-terminology-02.txt. However, the schema described in this work must be extended to include QoS actions other then marking, shaping and policing. The schema includes only a basic set of variables and constants, and useful implementations must add their own.

There is an acute need for a mechanism or method with which policies may be represented using information structures that are accessible to and usable by other network elements.

SUMMARY OF THE INVENTION

The foregoing objects and advantages, and other objects and advantages that will become apparent from the following description, are achieved by the present invention, which comprises, in one embodiment, a method of integrating a network with policies representing quality of service treatments of network data flows for network devices. The method may comprise creating and storing information structures representing one or more of the policies representing quality of service treatments of network data flows for network devices according to a schema that is disclosed herein. The schema may be used to facilitate establishing QoS policies in network devices by creating and storing application information that associates one or more traffic flows generated by an application program, including information identifying one or more points at which an application generates the traffic flows; receiving device QoS information that defines one of more quality of service treatments that the network device may apply to data processed by the network device; based on the device QoS information and the application information, determining one or more processing policies that associate the traffic flows with the quality of service treatments; and creating and storing one or more mappings of the application information to the quality of service treatments that may be used to generate the quality of service value when the application program generates traffic flows.

In one feature, creating and storing information structures comprises creating and storing one or more policy trees, each policy tree comprising one or more policy domains and one or more repositories, each policy domain comprising one or more policy rules that reference one or more conditions and actions that are defined in the repositories and that represent one or more of the policies representing quality of service treatments of network data flows for network devices.

In another feature, creating and storing information structures comprises creating and storing one or more policy trees, each policy tree comprising one or more policy domains and one or more repositories, each policy domain comprising one or more policy rules that reference one or more conditions, actions and policers that are defined in the repositories and that represent one or more of the policies representing quality of service treatments of network data flows for network devices, and wherein each of the policers represents a flow limit on one or more of the network data flows.

In still another feature, creating and storing information structures comprises creating and storing one or more policy trees, each policy tree comprising one or more policy domains and one or more repositories, each policy domain comprising one or more policy rules that reference one or more conditions and actions that are defined in the repositories and that represent one or more of the policies representing quality of service treatments of network data flows for network devices; creating and storing one or more definitions of variables and constants in at least one of the repositories.

In yet another feature, creating and storing information structures comprises creating and storing one or more policy trees, each policy tree comprising one or more policy domains and one or more repositories, each policy domain comprising one or more policy rules that reference one or more conditions and actions that are defined in the repositories and that represent one or more of the policies representing quality of service treatments of network data flows for network devices; creating and storing one or more sub-policy objects associated with one of the policies in one of the policy domains, wherein each sub-policy object comprises at least one condition, action, and trigger.

Still another feature involves storing the mappings in a repository that is accessible by the application program; converting the mappings into one or more settings of the network device; and enforcing one of the processing policies at the network device in response to receiving traffic from the application program that matches the traffic flow type.

According to another feature, the method may involve creating and storing one or more classes that classify the traffic flows, each of the classes comprising one or more types of traffic flows; based on the device QoS information and the classes of the traffic flows, determining one or more processing policies that associate the traffic flows with the quality of service treatments. Another feature is that receiving application information comprises receiving one or more application code points that represent traffic flow types. Alternatively, receiving application information comprises receiving one or more differentiated services codes that represent traffic flow types.

In another feature, creating and storing one or more mappings comprises creating and storing one or more policies, concerning network processing of traffic flows generated by the application program, in the repository. Alternatively, creating and storing one or more mappings comprises creating and storing one or more policies, concerning network processing of traffic flows generated by the application program, in a policy store that is coupled to the repository. In still another alternative, creating and storing one or more mappings comprises creating and storing one or more policies, concerning network processing of traffic flows generated by the application program, in a directory. Yet another alternative is that creating and storing one or more mappings comprises creating and storing one or more policies, concerning network processing of traffic flows generated by the application program, in a policy server coupled to a Lightweight Directory Access Protocol directory that comprises the repository.

According to another feature, creating and storing one or more mappings further comprises creating and storing, in the repository, one or more mappings of Application Code Points of the application program to one or more Differential Services Code Points of a protocol associated with the network device. Further, creating and storing one or more mappings may comprise generating one or more messages in RSVP+ ( ) and communicating the messages to the network device.

In yet another feature, receiving application information comprises receiving application information that defines one or more traffic flows generated by an application program, including information identifying one or more points at which an application generates the traffic flows, from a first individual having responsibility for managing enterprise applications in the network. Further, receiving device QoS information may comprise receiving device QoS information that defines one of more quality of service treatments that the network device may apply to data processed by the network device, from a second individual having responsibility for managing the network.

In one embodiment, determining one or more processing policies comprises creating and storing one or more policy statements in a repository, wherein each policy statement associates a condition of one of the traffic flows, an operator, an operand, and an action comprising one of the quality of service treatments. Alternatively, determining one or more processing policies comprises creating and storing one or more policy statements in a repository, wherein each policy statement is represented by a plurality of nodes that represent a condition of one of the traffic flows, an operator, an operand, and an action comprising one of the quality of service treatments. In still another alternative, determining one or more processing policies comprises creating and storing one or more policy statements in a directory, wherein each policy statement is represented by a plurality of nodes that represent a condition of one of the traffic flows, an operator, an operand, and an action comprising one of the quality of service treatments, and wherein the plurality of nodes is coupled to a root node having a distinguished name in the directory.

Each of the mappings may comprise an application code point value stored in associated with a differentiated services code point value.

Enforcing one of the processing policies may comprise requesting an operating system function to modify a packet of the traffic flows using a policy element that requests a different operating system function according to the operating system then in use; at the network device, in response to receiving traffic from the application program that matches the traffic flow type and in response to the operating system function, modifying the packet to activate a quality of service treatment of the network device.

BRIEF DESCRIPTION OF THE DRAWINGS

The present invention is illustrated by way of example, and not by way of limitation, in the figures of the accompanying drawings and in which like reference numerals refer to similar elements and in which:

FIG. 1A is a partial block diagram of a network message.

FIG. 1B is a partial block diagram of a network message.

FIG. 1C is a partial block diagram of a network message.

FIG. 7A is a flow diagram of steps of a configuration phase of operating the system of FIG. 6A and FIG. 6B.

DETAILED DESCRIPTION OF THE PREFERRED EMBODIMENT

A method and apparatus for storing policies for use in policy-based management of quality of service treatments of network data traffic flows is described. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

OPERATIONAL CONTEXT

1. NETWORK

Figure 2:
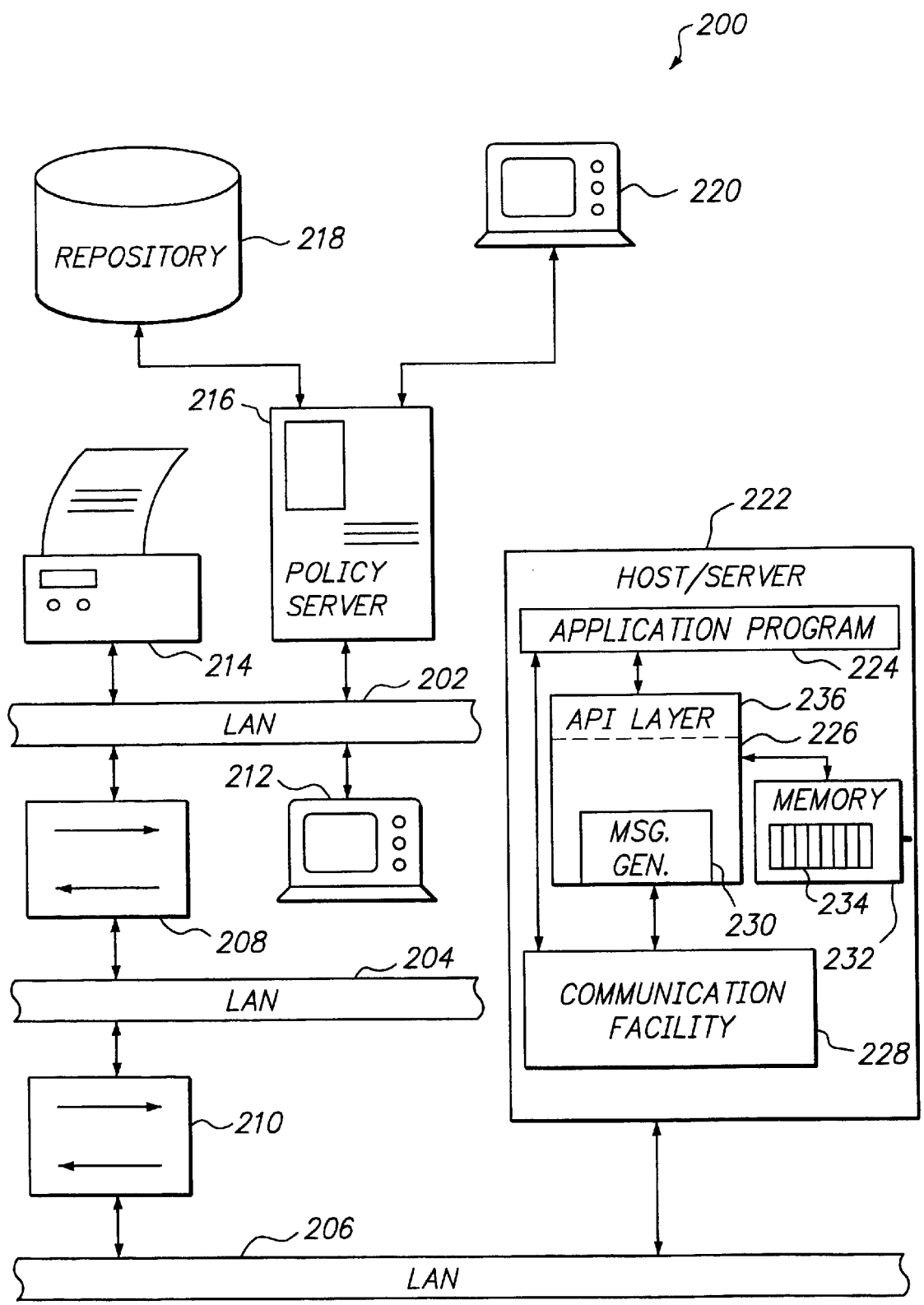
FIG. 2 is a simplified block diagram of a computer network.

An embodiment of the invention is used in the context of a network. FIG. 2 is a block diagram of a computer network 200 that includes a plurality of local area networks 202, 204, 206 interconnected by a plurality of intermediate network devices 208, 210. A plurality of network end stations, such as end station 212 and print server 214, are coupled to the LANs. The network further includes at least one policy server 216 that may be coupled to a repository 218 and to a network administrator station 220. A server suitable for use as policy server 216 is any Windows NT® or UNIX workstation or similar computer platform. Network 200 also includes at least one host or server 222 configured in accordance with the present invention.

Server 222 includes at least one application program or process 224, a flow declaration component 226 and a communication facility 228. The flow declaration component 226 includes a message generator 230 that communicates with the communication facility 228. Flow declaration component 226 also is coupled to an associated memory 232 for storing one or more traffic flow data structures 234. The application program 224 communicates with both communication facility 228 and, through application programming interface (API) layer 236, to flow declaration component 226. Communication facility 228, in turn, is connected to network 200 by LAN 206. The server 222 also comprises conventional programmable processing elements, which may contain software program instructions pertaining to the methods of the present invention. Other computer readable media may also be used to store the program instructions.

Communication facility 228 preferably includes one or more software libraries for implementing a communication protocol stack allowing server 222 to exchange messages with other network entities, such as end station 212, print server 214, etc. In particular, the communication facility 228 may include software layers corresponding to TCP/IP, Internet Packet Exchange (IPX) protocol, the AppleTalk protocol, the DECNet protocol and/or NetBIOS Extended User Interface (NetBEUI). Communication facility 228 further includes transmitting and receiving circuitry and components, including one or more network interface cards (NICs) that establish one or more physical ports to LAN 206 or other LANs for exchanging data packets and frames.

Intermediate network devices 208, 210 provide basic bridging functions including filtering of data traffic by MAC address, "learning" of a MAC address based upon a source MAC address of a frame, and forwarding of the frame based upon a destination MAC address or route information field (RIF). They may also include an IP software layer and provide route processing, path determination, and path switching functions. In one embodiment, devices 208, 210 are computers having transmitting and receiving circuitry and components, including network interface cards (NICs) establishing physical ports, for exchanging data frames. Intermediate network device 210, moreover, preferably is configured as a local policy enforcer for traffic flows originating from server 222, as described below.

Network 200 is illustrated as an example only. Embodiments disclosed in this document will operate with other, possibly far more complex, network topologies. For example, repository 218 and network administrator station 220 may be coupled directly or indirectly to policy server 216 through zero or more intermediate devices.

2. LOCAL POLICY ENFORCER

Figure 3:
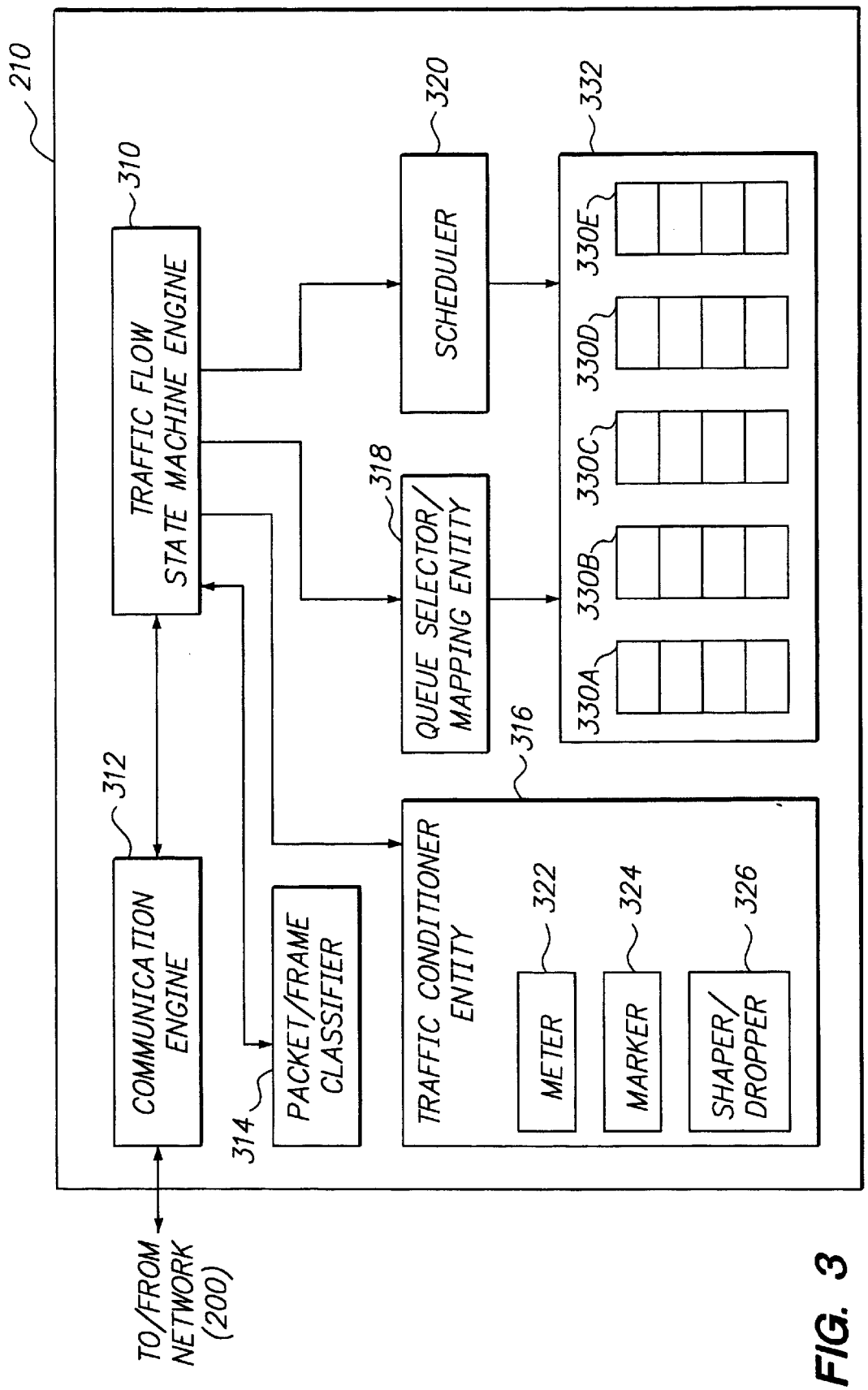
FIG. 3 is a simplified partial block diagram of a local policy enforcer.

FIG. 3 is a block diagram of local policy enforcer 210, which generally comprises a traffic flow state machine engine 310 for maintaining flow states corresponding to server 222 traffic flows, as described below. The traffic flow state machine engine 310 is coupled to a communication engine 312. Communication engine 312 is configured to formulate and exchange messages with the policy server 216 and flow declaration component 226 at server 222. Thus, communication engine 312 includes or has access to conventional circuitry for transmitting and receiving messages over network 200.

The traffic flow state machine engine 310 also is coupled to several traffic management resources and mechanisms. In particular, traffic flow state machine engine 310 is coupled to a packet/frame classifier 314, a traffic conditioner entity 316, a queue selector/mapping entity 318, and a scheduler 320. The traffic conditioner entity 316 includes several sub-components, including one or more metering entities 322, one or more marker entities 324, and one or more shaper/dropper entities 326. The queue selector/mapping entity 318 and scheduler 320 operate on the various queues established by local policy enforcer 210 for its ports and/or interfaces, such as queues 330a–330e corresponding to interface 332.

The term "intermediate network device" broadly means any intermediate device for interconnecting end stations of a computer network, including, without limitation, Layer 3 devices or routers as defined by RFC 1812; intermediate devices that are partially compliant with RFC 1812; intermediate devices that provide additional functions such as Virtual Local Area Network (VLAN) support; and Layer 2 intermediate devices such as switches and bridges, etc.

POLICY SYSTEM
1. ARCHITECTURE

Figure 6A:
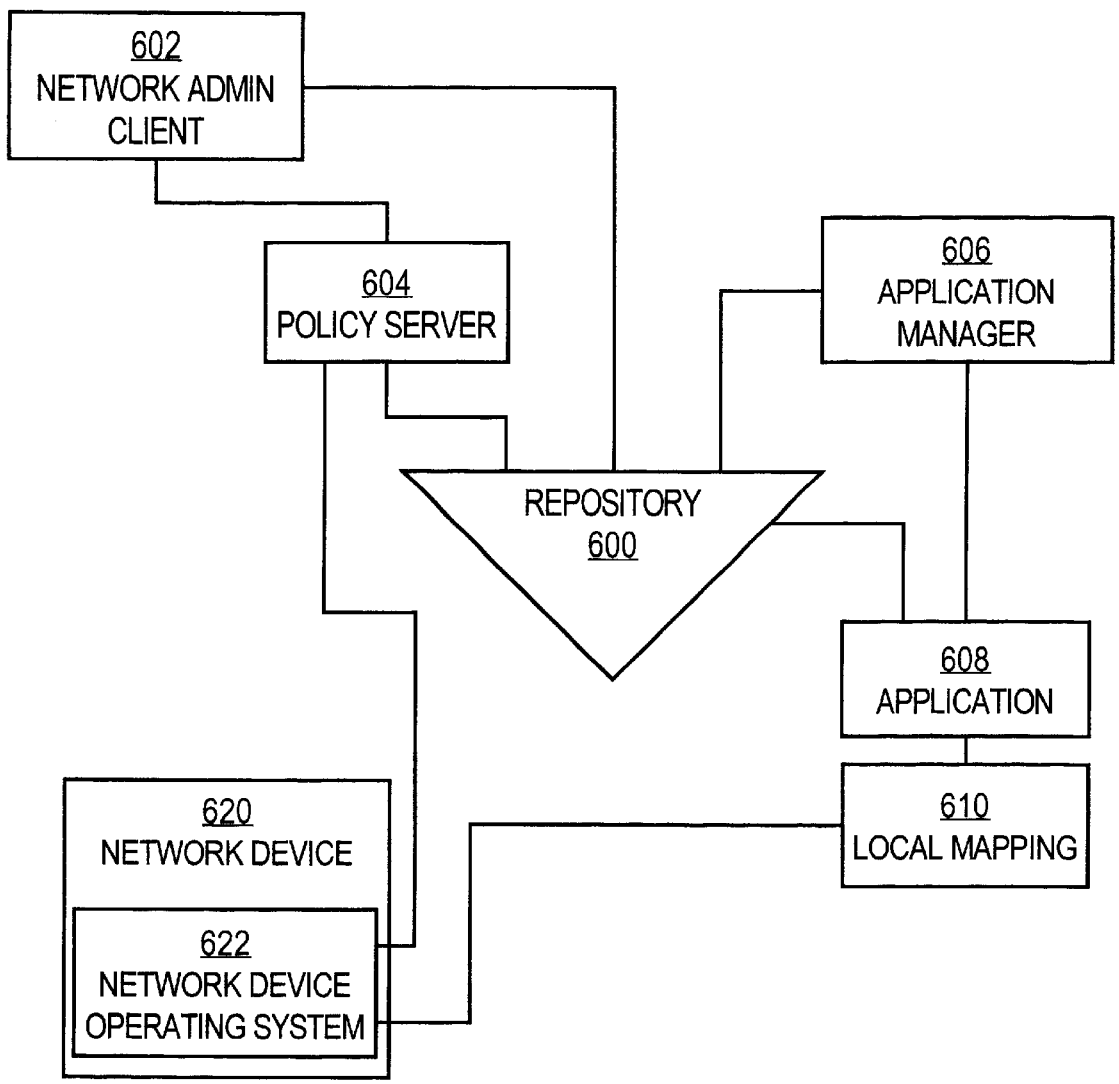
FIG. 6A is a block diagram of a system that provides policy-based QoS treatment for application traffic flows.

FIG. 6A is a block diagram of a system that provides policy-based QoS treatment for application traffic flows. Generally, the system of FIG. 6A comprises a Policy Server 604, a Repository 600, and an Application 608.

The Application 608 generally is an enterprise software application program that runs on a server computer. For example, Application 608 may comprise an Oracle® database system, a PeopleSoft® human resources system, or any other application. Application 608 is coupled to Repository 600 and to an Application Manager 606, the functions of which are described further below. Application 608 is also coupled to a Local Mapping 610, described below.

Repository 600 stores polices that are associated with applications. Repository 600 which may comprise a directory server, such as Netware Directory Server, Windows Active Directory, etc., or a database. Advantageously, use of a Repository offers security. The format of the Repository is known only to a network vendor that supplies the Repository, or to a network administrator. Thus, only authorized applications may access the Repository.

A Schema stored in the Repository provides an integration point and a common information model for communication between Application 608 and Policy Server 604. Application 608 extends the Schema by adding application-specific parameters to it. The extended Schema describes the application and its specific parameters. For example, the Schema describes an Application Code Point and its possible values. When Application 608 is a Web server, the Schema describes a URL and its user name. Other examples of parameters include type of transaction; user identifier; application identifier; a text description; and others.

The application-specific parameters may be added manually, for example, using a schema definition file that is uploaded into the Repository 600. In another embodiment, the Repository 600 is a Directory Server compatible with Lightweight Directory Access Protocol (LDAP), and the application-specific parameters are added dynamically using LDAP. The precise mechanism for adding parameters is not critical. What is important is that each application contacts the Repository and declares one or more parameters that the application will use for classification of QoS of network devices that handle traffic flows generated by the application.

Policy Server 604 provides a mechanism by which a network administrator or may map application parameters into network services. A Network Administration Client 602 is coupled to Policy Server 604. A network administrator may use Network Administration Client 602 to communicate with Policy Server 604. Each network service defines how an application should access it. For example, access may comprise setting a DiffServ Code Point in the packets, by setting IP Precedence values in the packets, or by signaling using RSVP. An example of a commercial product suitable for use as Policy Server 604 is CiscoAssure QoS Policy Manager 1.0, commercially available from Cisco Systems, Inc.

Policy Server 604 is coupled to one or more network devices 620, each of which executes a network device operating system 622. An example of a network device 620 is a router and an example of a network device operating system 622 is IOS. Policy Server 604 configures the network devices 620 to implement the network services and to correctly respond to signaling from Application 608. For example, Policy Server 604 may map an Application Code Point to a DiffServ Code Point or IP precedence value. Such mappings of ACPs to DSCPs may be stored in Local Mapping 610 so that they are immediately accessible to Application 608 when it is executing in real time.

A mapping may apply for all application instances, for all application instances running on some subnet or on a single machine, or for a single instance identified by its IP address and source port number. The latter is useful, for example, when several Web servers are running on the same host. Thus, different mappings can be defined for the same Application Code Points, depending on the particular installation instance. The mapping translates single application QoS requirements into policies or requests that are centrally coordinated and in compliance with network-wide multi-application policies.

Figure 6B:
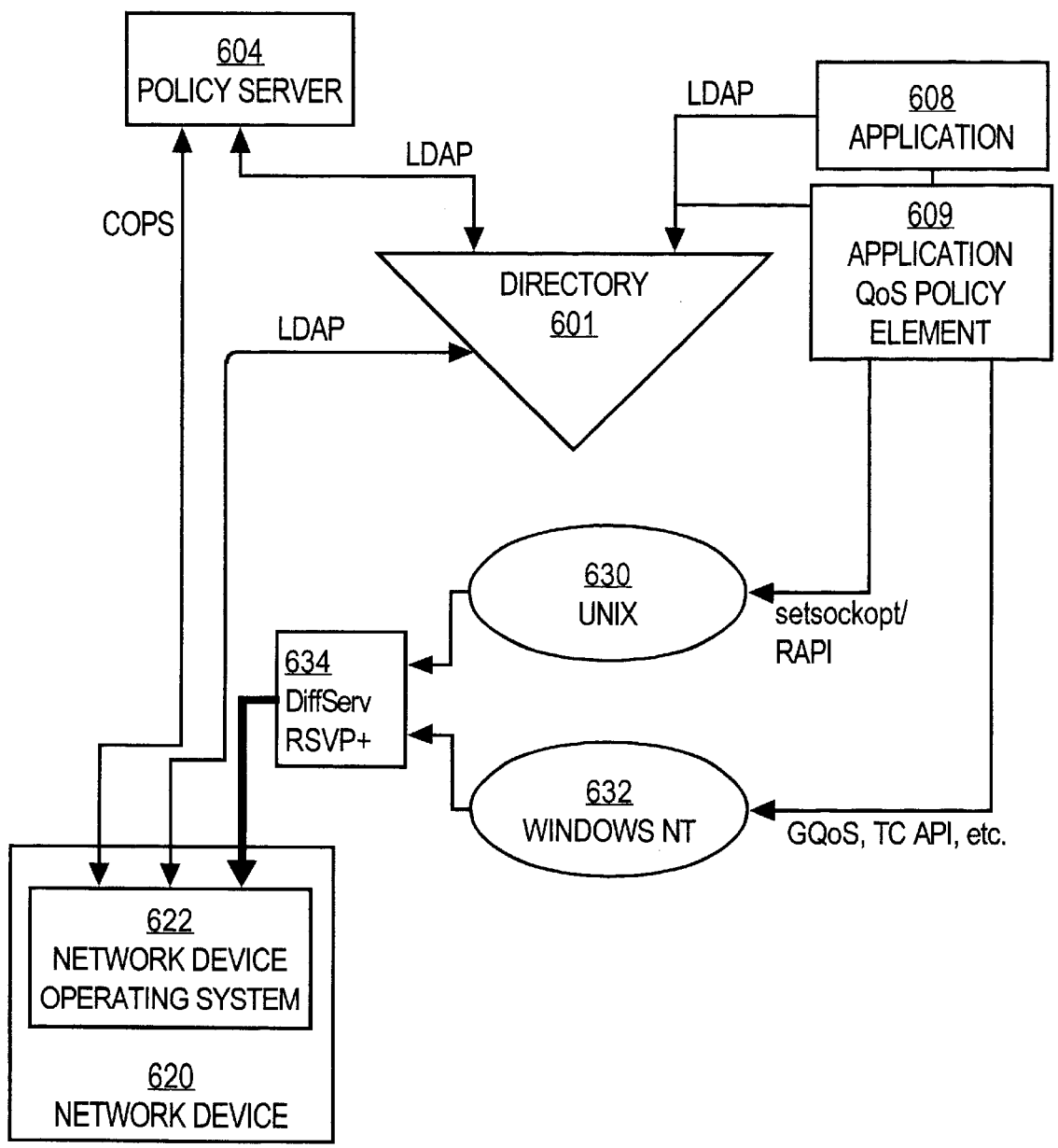
FIG. 6B is a block diagram of the system of FIG. 6A showing structures relating to multi-platform support.

FIG. 6B is a block diagram of the system of FIG. 6A showing architectural details that provide multi-platform support. As in FIG. 6A, Policy Server 604 and Application 608 are coupled to a repository, which in this embodiment is implemented in the form of an LDAP-compliant Directory 601. Policy Server 604 and Application 608 communicate with Directory 601 using LDAP function calls.

Application 608 is tightly coupled to or integrated with an application QoS policy element 609. In one embodiment, element 609 is one or more software programs, processes, or modules that can be linked to application 608 and called by the application. Element 609 implements the functions described herein including those of FIG. 7B. Element 609 may communicate with Directory 601 using LDAP calls.

Element 609 can set QoS services of a network device, for example, by setting DiffServ bits of packets of a flow of application 608, using functions of a UNIX operation system 630 and a Windows NT operating system 632. Any other operating system may be supported; UNIX and Windows NT are illustrated merely as examples. In one embodiment, element 609 selectively an alternatively calls the "setsockopf" function of UNIX, or the GqoS or TC APIs of Windows NT to set QoS bits of packets of a particular application flow. As a result, DiffServ or RSVP+ information is created, as indicated by block 634. The QoS information of block 634 is passed in packets of the flow to network device operating system 622. In response, network device 620 applies a desired QoS to the flow.

Advantageously, the architecture of FIG. 6B supports multiple platforms using APIs, provides policy integration using LDAP, and supports both DiffServ and RSVP+.

2. OPERATION OF THE SYSTEM

Operation of the system of FIG. 6A or FIG. 6B generally comprises two phases: a configuration phase and an operation phase. The phases may execute in parallel.

FIG. 7A is a flow diagram of steps that may be carried out in the configuration phase. In block 702, ACPs associated with an application are registered in a repository. For example, Application 608 registers one or more Application Code Points in Repository 600. In one embodiment, Application 608 directly registers ACPs in Repository 600. Alternatively, Application Manager 606 receives information about traffic flows from Application 608, classifies the traffic flows into groups, maps the groups to ACPs, and registers the ACPs in Repository 600.

In block 704, policies are established based on the ACPs that are registered in association with the application. In one embodiment, Network Administration Client 602 or a network manager receives the ACP values. The network manager need not receive information about Application 608 or its traffic flows, however, the network manager or Network Administration Client 602 normally has extensive knowledge about managed devices in the network and the QoS services and features that they support. In response, the network manager establishes policies that associate conditions, operators, and the ACP values with actions or services of the devices. The policies may implement DiffServ or RSVP strategies. The policies may be stored in a storage device. Definition and storage of policies may be carried out using Policy Server 604.

In block 706, the ACPs are mapped to DiffServ Code Points and the resulting mapping is stored in a repository. For example, Policy Server 604 may use one or more LDAP calls to store mappings of ACP values to DSCP values in Repository 600. In the preferred embodiment, block 706 also involves automatically storing the mappings in a Local Mapping that is associated with and accessible to the application when it is executing.

Figure 7B:
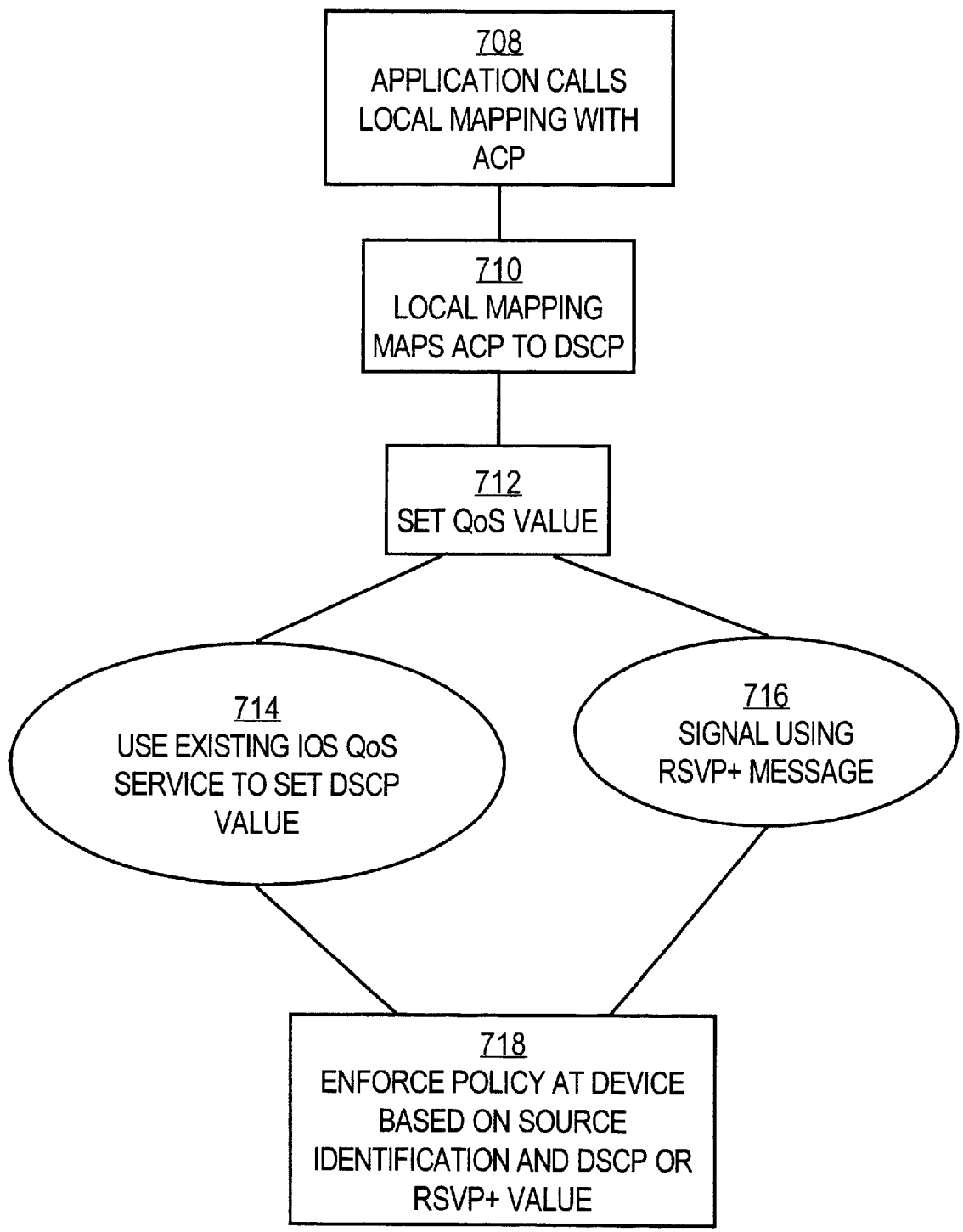
FIG. 7B is a flow diagram of steps of an active phase of operating the system of FIG. 6A and FIG. 6B.

FIG. 7B is a flow diagram of an active phase of operating the system. Application 608 executes. When an ACP is reached in execution of Application 608, the application calls its Local Mapping and passes it an ACP value associated with the current ACP, as shown by block 708. Alternatively, the application fetches mapping information from the Repository. When the Repository is an LDAP Directory, the application may use LDAP calls to fetch the information. In this embodiment, the application is modified or configured so that the application is LDAP-enabled, for example, by incorporating LDAP reference code or libraries.

Block 708 may also involve the steps of processing the information received from the Repository for efficient look up. In another embodiment, block 708 involves polling the Repository for policy changes that are stored in the Repository after the mapping information is retrieved. Further, block 708 may involve listening for notification of policy changes.

For each flow generated by the application, this information is then used to map the application parameters attached to the flow into a concrete QoS decision and a signaling mechanism. For example, the process is notified by the application about the start of each flow, with its parameters, and this information is converted into QoS information usable by a network device. The simplest case is mapping one ACP into a DSCP value, as shown by block 710, and then setting a QoS value of packets of the flow, as shown by block 712. For example, a QoS value may be set by marking the flow packets using an appropriate operating system call to an existing QoS service, as shown by block 714.

Alternatively, if the mapping information cannot be obtained or refreshed from the policy Repository, the application reverts to a backup mode of signaling the policy information itself, such as an ACP value, to the network device, e.g., using RSVP+, as shown by block 716. Thus, for short-lived flows, packets may be colored, whereas for long-lived flows, separate out-of-band messages may be used to establish QoS.

Standard APIs provided by the network operating system are used to signal the network. For example, GQOS or RAPI may be used for RSVP signaling. The APIs "GqoS" and "setsockopt" of IOS may be used for DiffServ or IP Precedence marking.

The application and the policy system may use event services, such as CNS, to publish and subscribe to event notifications regarding policy changes. Upon such events the application should download and use the new policies. Alternatively, the application can poll the policy repository.

In block 718, the policy is enforced at a network device, based on information identifying the source of the packet and the DSCP or RSVP+ value associated with the packet. In one embodiment, a service of IOS enforces the policy based on the values.

The selection of DiffServ or RSVP+ as a policy enforcement mechanism is a matter of network policy. DiffServ is integrated in the network using the Repository described herein, with the defined Schema and LDAP for communications, and can handle all sessions, including short-lived flows. RSVP+ is integrated using a network device that supports RSVP+. It enables signaling QoS information from non-core or third-party applications, and is well suited for use with non-trusted hosts. Typically, DiffServ is preferred if the application supports it, and RSVP+ is a default mechanism.

3. USERMODEL

Using the system and process described above, network applications may request network QoS based on application-specific parameters. A network manager maps the application-specific parameters into concrete network services. However, this approach requires the network manager to be familiar with the application-specific parameters and what they mean. Some applications are complex, such as Enterprise Resource Planning (" ERP") applications, and require deep knowledge and expertise to operate properly. The network manager may not have such expertise. Normally such expertise resides with an application manager or information technology manager of the organization that is using the application.

Figure 4:
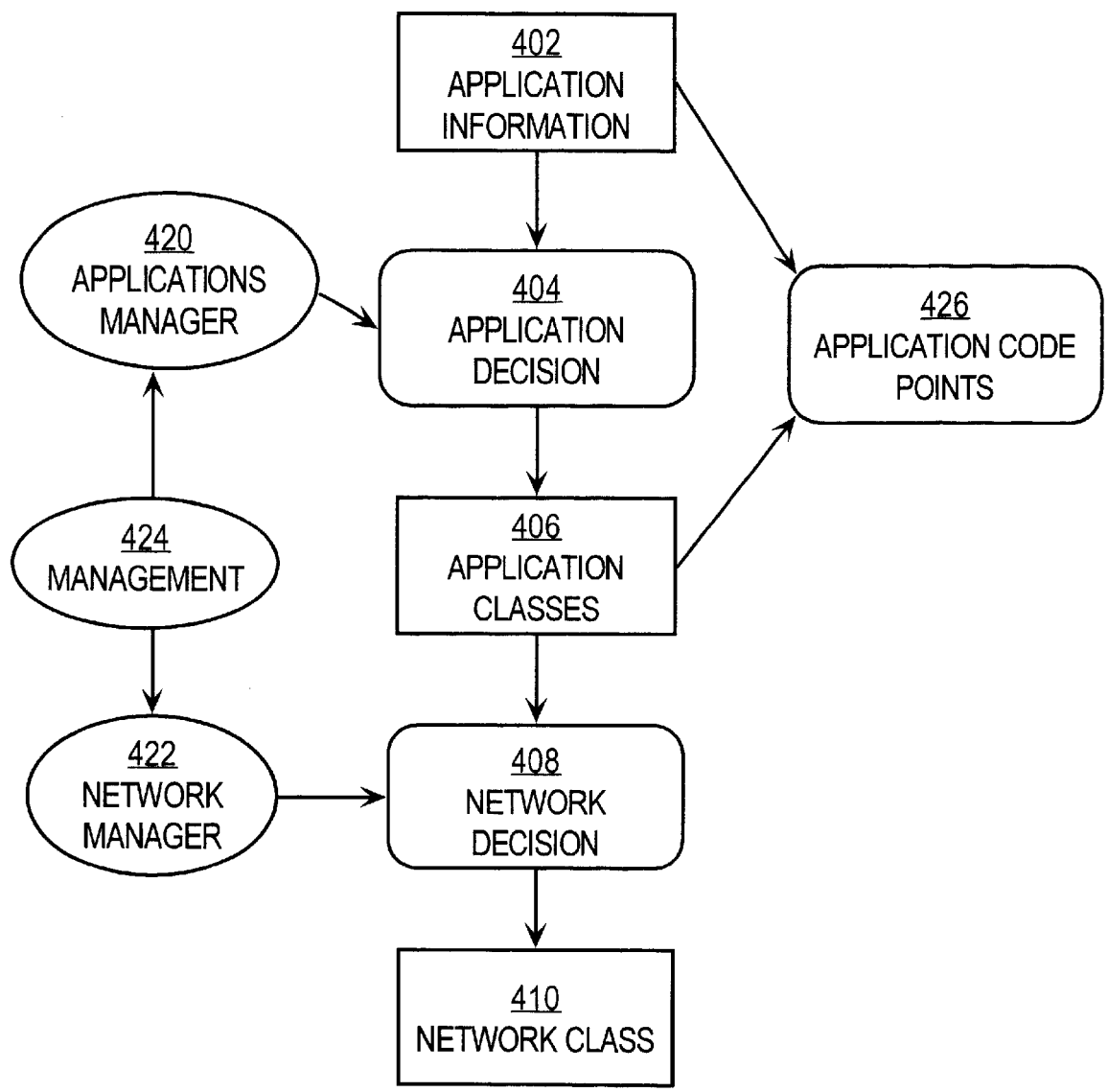
FIG. 4 is a block diagram of a process of determining application quality of service information.

FIG. 4 is a block diagram of a process of determining application-specific network QoS information. The process of FIG. 4 partitions decision-making about application QoS among an applications manager 420 and a network manager 422 in a manner that allows distributed decision-making yet is simple for the network manager to control.

Applications manager 420 is an individual who has expertise operating a particular application. Examples of applications include databases, ERP applications, sales force automation applications, human resources applications, etc. Applications manager 420 receives extensive application information 402 that defines, among other things, the types of network messages, traffic and flows that are generated by the application in operation. Applications manager 420 makes an application decision 404, resulting in creating one or more application classes 406 that categorize the messages, traffic and flows into a smaller number of groups. For example, application information 402 might inform applications manager 420 that a particular application generates eight (8) different kinds of log and warning error messages. The applications manager may decide to classify all such messages as "medium" priority traffic.

The mapping of application information to application classes may be represented by creating and storing one or more Application Codepoints (ACPs) 426. Thus, the application pre-defines a set of application classes or Application Codepoints 426. The ACPs identify and define one or more types of traffic flows or classes that are produced by an application. ACPs may define application flows in a static manner, for example, according to intrinsic application parameters. For example, one ACP value may be associated with all traffic generated by a specific application module. Another ACP may identify batch traffic, and another may identify transactional traffic.

Table 1 provides one example of a mapping of ACPs to priority descriptions.

TABLE 1

| ACP | DESCRIPTION |
| --- | --- |
| 1 | HIGH PRIORITY |
| 2 | MEDIUM PRIORITY |
| 3 | NORMAL PRIORITY |
| 4 | LOW PRIORITY |

Table 2 provides another example of a mapping of ACPs to application traffic flow descriptions.

TABLE 2

| ACP | DESCRIPTION |
| --- | --- |
| 1 | FINANCE TRANSACTION |
| 2 | FINANCE REPORTING |
| 3 | HR TRANSACTION |
| 4 | HR REPORTING |

Sequential ACP values are shown in Table 1 and Table 2, however, an ACP may have any value, according to any order. Any number of ACP values may be defined. The number of ACPs that are defined depends upon the level of detail ("granularity") of control that is desired for traffic flows of an application.

To establish ACPs 426 for an application, an application manager 420 may edit a configuration file that maps ACP values to application flows. For example, application manager 420 could be a Webmaster who prepares a configuration file that maps URLs and users into pre-defined application classes such as High, Medium, and Low.

Network manager 422 is an individual having expertise in configuring, operating, and maintaining a network, such as network 200 of FIG. 2. Network manager 422 receives the application classes 406 and, based on the network manager's accumulated expertise in network operations, makes a network decision 408 that maps each of the application classes 406 into one or more network classes 410. The network classes 410 represent a mapping of a specific QoS for the network, typically in terms of DSCPs or RSVP+ messages.

For example, the network manager 422 may decide to map the High class of traffic to DSCP "52." Table 3 is an example of a mapping of ACP values to policy values.

TABLE 3

| ACP VALUE | DSCP VALUE |
|---|---|
| 1 | 50 |
| 2 | 32 |
| 3 | 32 |
| 4 | 24 |

Preferably, such mappings are stored in the Repository in the manner described in this document. The mappings may be created and stored using an external application program. Preferably, the program creates and stores a default policy value, e.g., a default DSCP value, when no mapping is created for a particular ACP value. This simplifies the mapping process.

Both network manager 422 and applications manager 420 may be influenced by external management 424 and its policies and procedures.

In operation, the application consults with the policy system in order to complete the mapping from the ACPs into network services, for example, into DSCP values. Generally, such mapping is stored in the Repository. The policy manager uses the policy system to store the mappings in the Repository, and an application uses an access protocol such as LDAP to retrieve a mapping from the Repository.

In one embodiment, the mapping from ACPs to network services is communicated between applications manager 420 and network manager 422 using a Service Level Agreement. The applications manager and network manager may be associated with different enterprises. Advantageously, applications manager 420 only needs to prepare a mapping of an application function into an ACP and may ignore details of the network services that are used to achieve a particular QoS. Further, network manager 422 only needs to prepare a mapping of ACPs to network services and need not know or consider the application functions that are handled.

As a result, network manager 422 considers only groups or classes of application traffic flow and need not know or consider a much larger set of application functions that fall into such groups or classes. Minimizing the number of ACPs will optimize the local policy matching process. Further, flexibility and granularity in decision-making are supported, because the application manager 420 may consider all application parameters and permutations before determining application policies. Accordingly, application managers may participate in the decision process pertaining to QoS for applications. A network administrator may control even the most complicated applications, which might involve many application-specific parameters and require extensive application-specific expertise.

INFORMATION MODEL

In a system of the general type described in this document, it is desirable to have a standard QoS policy schema to provide a way for different policy servers and management tools to interoperate. For example, it is desirable to provide a way for multiple QoS policy servers to interoperate with each other. It is also desirable to provide a way for multiple policy servers, each belonging to one or more different disciplines, such as Security, IP Address Management, or QoS, to interoperate.

In each case, the purpose of interoperability is to be able to exchange policy information and coordinate the application of policies between different Policy Servers. In general, a network may consist of many heterogeneous devices, most of which are controlled by a given set of policies. Problems include both the number of devices as well as the inherent differences in their capabilities. In this document a schema is disclosed that supports interoperability that enables the network to be partitioned into smaller groups of devices that are under a single administrative policy domain. Furthermore, the schema acknowledges that, due to the wide differences in functional capabilities that devices have, it is unreasonable to expect a single Policy Server to be able to control all types of devices. This schema enables multiple Policy Servers to communicate and exchange information, so that they can coordinate the application of policies to devices in the policy domains that they control.

FIRST IMPLEMENTATION

In an embodiment, the Repository stores one or more Policy Statements. Each Policy Statement applies to a specific application or a set of applications, and may be specific to a logical instance of the application. It describes a condition and a network service to be applied for traffic matching that condition. A Policy Statement may comprise a general Boolean expression of its underlying policy conditions.

Each condition describes a subset of traffic flows of the application. Each condition comprises basic condition components. Each basic condition comprises a basic policy parameter identifier, an operator and an operand. Policy identifiers may be application-specific. Each policy identifier has a pre-defined type such as string, integer, or enumerated value. For example, a policy identifier may be "URL"; an operator may be "contains"; and an operand may be "www.cisco.com".

A plurality of global, pre-defined Policy Identifiers are stored. Pre-defined Policy Identifiers include source and destination IP address, source and destination port numbers, protocol, application identifier, and ACP. Application-specific policy identifiers are added to the Repository manually, or by a configuration file provided by the application, or by program calls using standard protocols such as LDAP. Alternatively, application-specific information to be loaded into the Repository is represented in Extended Markup Language (XML).

Figure 5A:
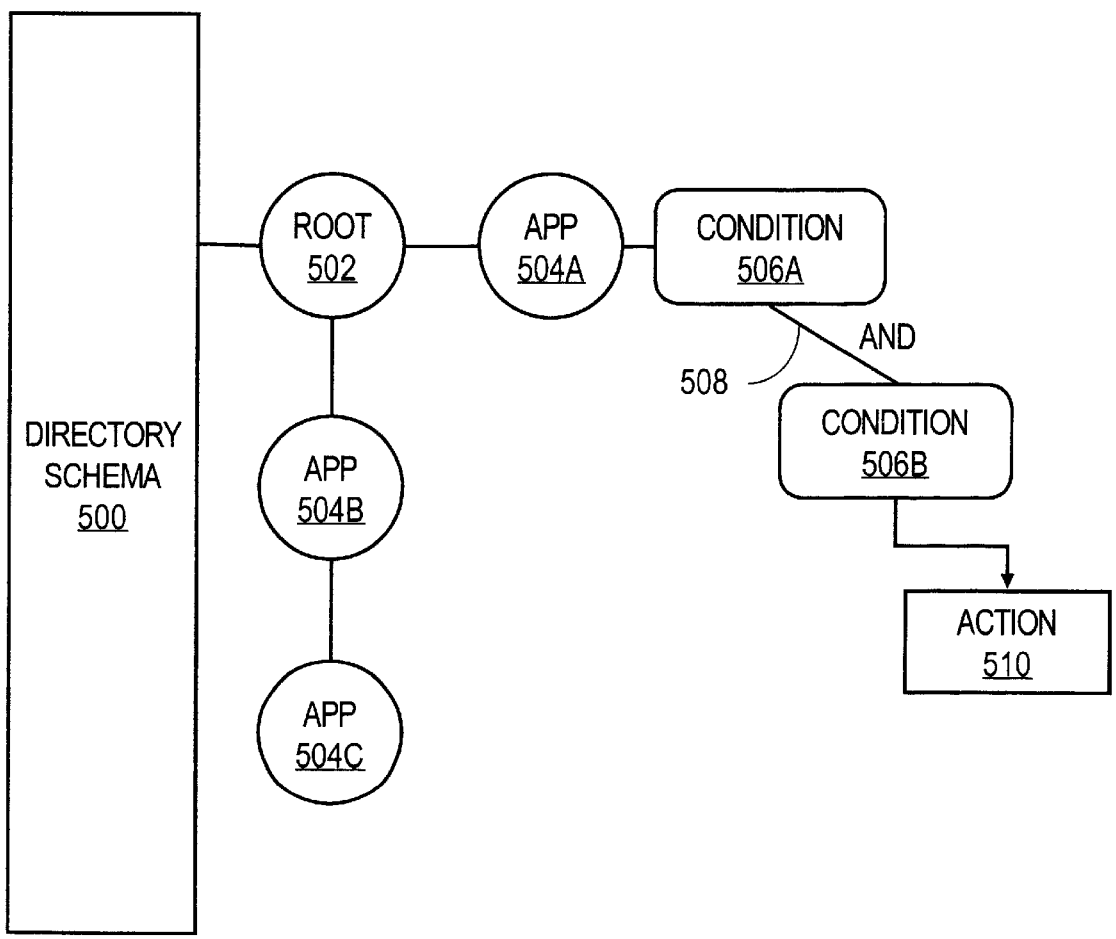
FIG. 5A is a block diagram of a portion of a Repository that contains a Directory Schema.

FIG. 5A is a block diagram of a portion of a Repository that contains a Directory Schema 500. The Directory Schema 500 may represent the topology of a managed network or other directory information useful in network management. A Root node 502 is coupled to Directory Schema 500. In this context, "Root" means that node 502 is the topmost node for a set of nodes that represent Policy Statements. The Root node 502 may have a Distinguished Name in the Directory Schema 500 of the type defined in the International Telecommunications Union (ITU) X.500 standard.

As shown in FIG. 5A, Root node 502 is coupled to a plurality of Application nodes 504A, 504B, 504C. There may be any number of Application nodes. Each Application node represents a particular application program that is used in the managed network. Child nodes of an Application node represent policies that are associated with that application.

Each Policy Statement in the Repository comprises stored information that represents a condition and an action involved in the policy. For example, Application node 504A is coupled to two Condition nodes 506A, 506B. Each condition comprises a parameter, an operator, and an operand. For example, a parameter may be a range of ACP values, or one or more URL statements that contain strings. Each operator is a comparison such as equal to, greater than, less than, in range, etc. Each condition evaluates to a Boolean value.

Conditions are joined by Boolean operators. For example, Condition node 506A is coupled to Condition node 506B by an AND operator 508. There may be any number of Condition nodes and any number of operators.

The Repository is associated with a list of network services that are implemented by the system. The list of services stores abstract definitions of services that are later translated into a specific configuration of a network device. Services are designated by arbitrary labels such as "Premium," "Gold," "Best Effort," etc., and each service is characterized by a set of service attributes such as delay, guaranteed bandwidth, limits, excess traffic treatment, a queuing type on a router interface, etc. The services in the list also define signaling mechanisms that may be used for accessing the service, for example, by using a specific DSCP or IP Precedence value.

Each Policy Statement terminates in an Action. For example, Condition nodes 506A, 506B terminate at Action node 510. Each Action node represents an action to apply to network devices when an associated application generates a traffic flow such that the Policy Statement evaluates to TRUE. An Action node may store information that indicates, for example, that network devices must service the flow using DSCP or IPP.

The Repository may be implemented in the form of a Directory Server, in a database, or using one or more files expressed in an Interface Definition Language (IDL).

SECOND IMPLEMENTATION

In a preferred embodiment, Directory Schema 500 of FIG. 6A is implemented in a QoS Policy Schema that is created and stored in Directory 601 by Policy Server 604 or by Application QoS Policy Element 609. The QoS Policy may be created and stored by or under control of one or more computer programs that form part of Policy Server 604 or Application QoS Policy Element 609. The computer programs may use one or more classes of the schemata. An hierarchical inheritance table for one implementation is shown in Table 4 below.

Figure 5B:
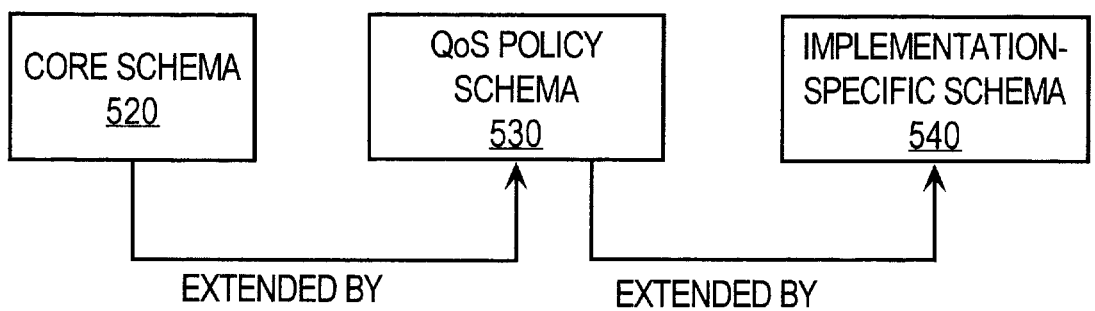
FIG. 5B is a block diagram of a hierarchy of schemata.

FIG. 5B is a block diagram showing that QoS Policy Schema 530 preferably is a middle layer in a three-level hierarchy of schemata implemented in Directory Schema 500. A Core Policy Schema 520 may be extended by a QoS Policy Schema 530, which may be extended by an Implementation-Specific Schema 540 for a particular managed network. Using this configuration, a specific QoS system may be modeled. The QoS Policy Schema 530 by itself may be insufficient to model a particular set of QoS services and systems, however, using the configuration presented herein, implementation-specific classes can be derived from this schema in order to model a specific QoS system in sufficient detail.

The Core Policy Schema 520 models high-level policy concepts and provides structural conventions and nomenclature common to all types of policies. The QoS Policy Schema 530 refines the concepts of the Core Policy Schema 520 and provides a framework of classes dedicated to model QoS Policy. The QoS Policy Schema 530 preserves the conventions of the Core Schema. An Implementation-Specific Schema 540 further specifies concepts of the QoS Policy Schema 530 into particular objects. Such a schema adds its own classes, both structural and auxiliary, to model a particular system. Such additional classes are, for example, specific QoS actions that are undefined in the QoS schema.

Table 4 illustrates a class hierarchy for the classes of QoS Policy Schema 530 and classes of Core Policy Schema 520.

TABLE 4

CLASS INHERITANCE HIERARCHY

```
|
+--policy (abstract)
|   |
|   +---policyGroup (structural)
|   |      |--------qosPolicyDomains (structural)
|   |      |--------qosPolicyDomain (structural)
|   |      |--------qosNamedPolicyContainer (structural)
|   +---policyRule (structural)
|   |      |--------QosPolicyRule (structural)
|   |
|   +---policyCondition (auxiliary)
|   |      |
|   |      +---policyTimePeriodCondition (auxiliary)
|   |      |
|   |      +---vendorPolicyCondition (auxiliary)
|   |      +
|   |      |--------QosPolicySimpleCondition (auxiliary)
|   |
|   +---policyAction (auxiliary)
|   |      |
|   |      +---vendorPolicyAction (auxiliary)
|   |      +
|   |      |--------QosColorPolicyAction (auxiliary)
|   |      +
|   |      |--------QosPolicyDSPolicerAction (auxiliary)
|   |      +
|   |      |--------QosCPolicyRSVPPolicerAction (auxiliary)
|   |
|   +--policyInstance (structural)
|   |
|   +--policyElement (auxiliary)
|   |
|   +--qosPolicyAtomFolders (structural)
|   |
|   +--qosPolicyAtomFolder (structural)
|   |
|   +--qosPolicyConditionFolder (structural)
|   |
|   +--qosPolicyAggDSPolicerFolder (structural)
|   |
|   +--qosPolicyRSVPPolicerFolder (structural)
|
+--policySubtreesPtrAuxClass (auxiliary)
|
+--policyGroupContainmentAuxClass (auxiliary)
|
+--policyRuleContainmentAuxClass (auxiliary)

|--qosPolicyVariable (auxiliary)
|
|--qosPolicyConstant (auxiliary)
|
|--qosPolicyValue (abstract)
|       |
|       +--qosPolicyNumberValue (auxiliary)
|       |
|       +--qosPolicyNumberRangeValue (auxiliary)
|       |
|       +--qosPolicyStringValue (auxiliary)
|       |
|       +--qosPolicyIPAddrValue((auxiliary)
|
|--qosPolicyDSPolicer (auxiliary)
|
|--qosPolicyRSVPPolicer (auxiliary)
|
|--qosPolicyTrigger (auxiliary)
```

In Table 4, classes having a name that includes the prefix qos form a part of the QoS Policy Schema.

CONTAINMENT HIERARCHY

Figure 8A:
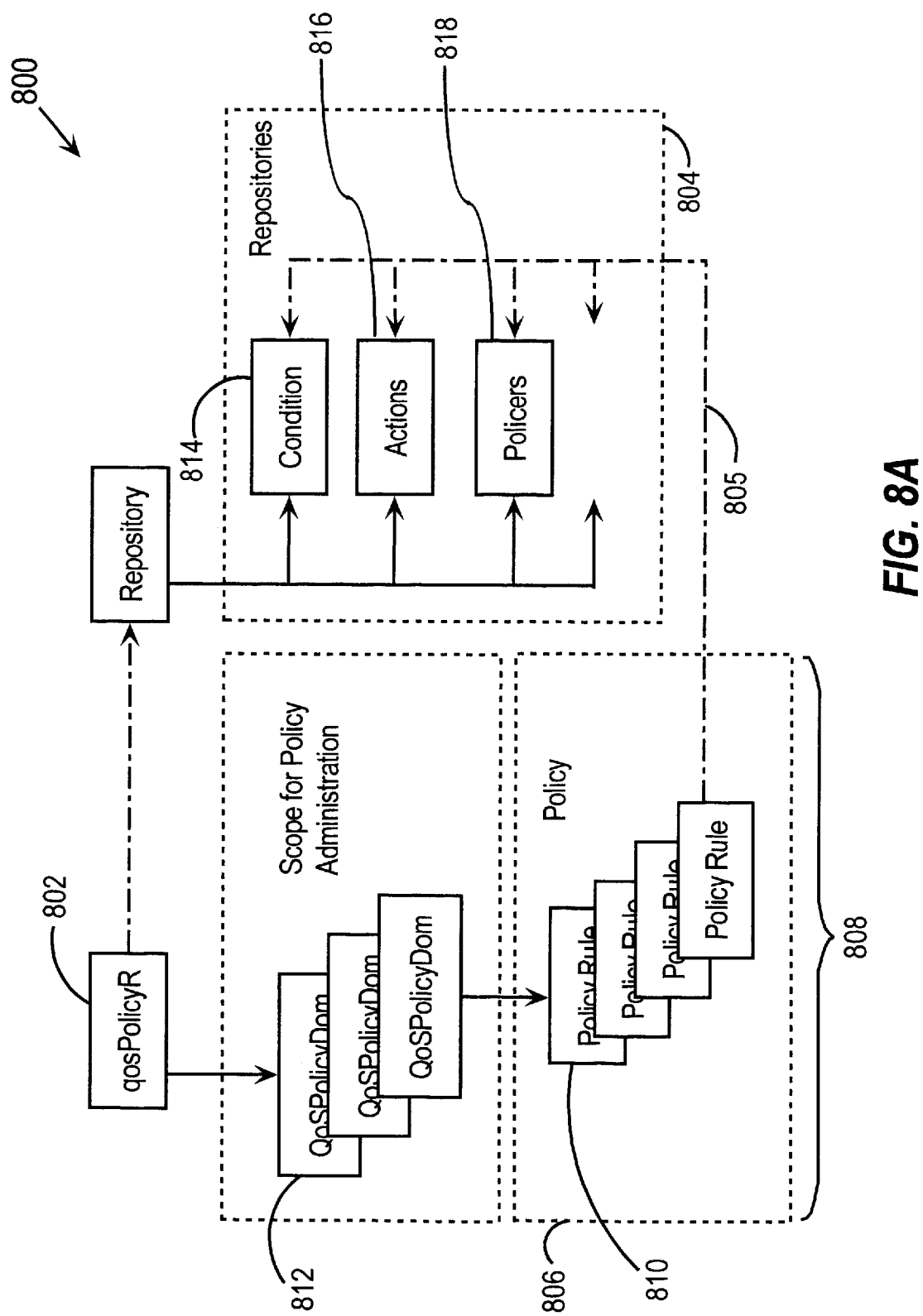
FIG. 8A is a block diagram of a containment hierarchy of a policy schema.

The fundamental data model of the QoS Policy Schema 530 is a tree hierarchy. FIG. 8A is a block diagram that showing a summary of a class containment hierarchy or tree 800 that may be used to implement the QoS Policy Schema 530. The tree 800 is structured as a plurality of containment relationships. Container objects that include sets of distinguished names (DNs) of contained objects model branch-to-leaf relationships. For example, a named policy container includes a list of DNs of contained rules. The use of DNs in the schema is described further in this document.

Containers may be based on auxiliary classes. A container may be attached to a branch level class so that leaves may be added. In addition, an entity may refer (by means of DN) to a reusable object. Reusable objects reside in repositories and can be referenced by multiple users. Reusable object references cross the hierarchy and are not considered part of the policy tree structure.

The root of tree 800 is a single-instance policy root object 802 that is named for convenience in this document as qosPolicyRoot, derived from a PolicyGroup class in the Policy Core Policy Schema 520. The qosPolicyRoot object 802 provides scoping for objects associated with two main branches of tree 800: reusable-objects repositories 804 and a policy tree 806. The two main branches divide the tree 800 into two major sections: a policy definition section 808 and reusable-objects repositories 804.

Figure 8B:
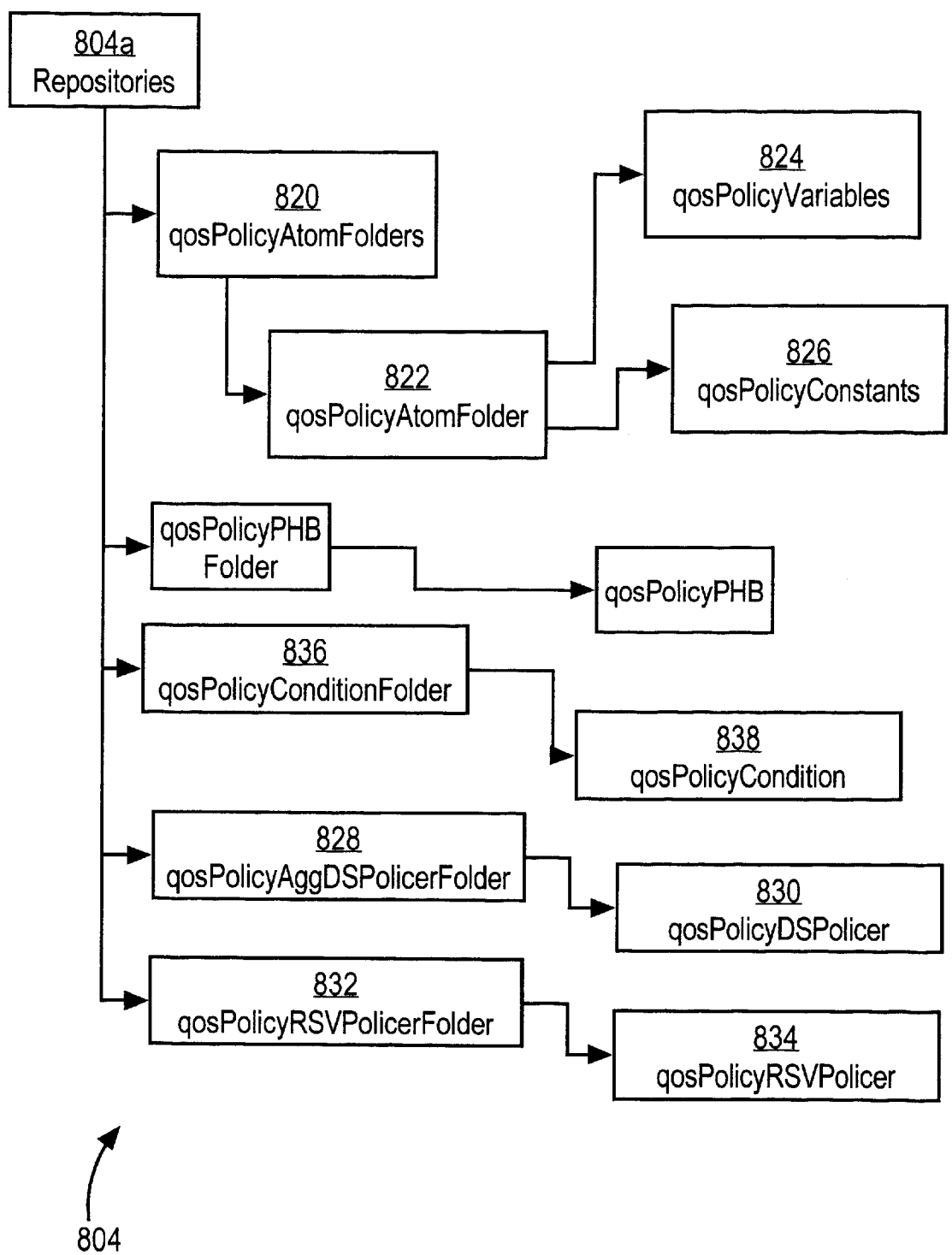
FIG. 8B is a block diagram of reusable object repositories.
Figure 8C:
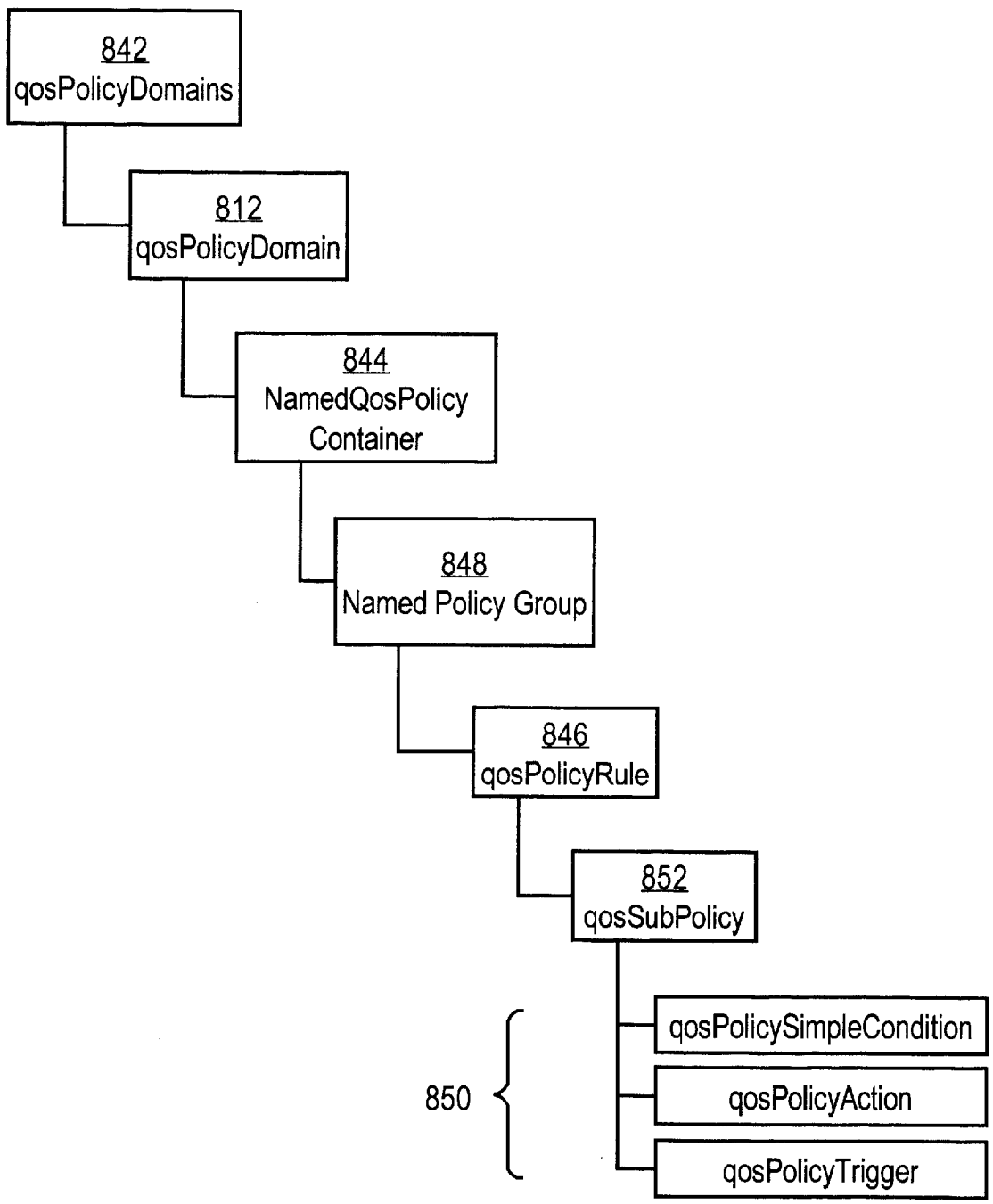
FIG. 8C is a block diagram of information structures that may form a policy domain.

The policy definition section 808 is rooted in a QoSPolicyDomain container object that is shown in FIG. 8C in the form of qosPolicyDomains object 842. Referring again to FIG. 8A, the QoSPolicyDomain container provides scoping for the application of one or more policy groups of Policy Rules 810. Each QoSPolicyDomain object 812 can contain its own set of groups of rules in the form of Policy Rules 810. A given Policy Rule 810 can be a member of multiple QoSPolicyDomain objects 812 and multiple Policy Rules 810 can be contained in a single QoSPolicyDomain object 812.

The reusable-objects repository 804 stores information that all QoSPolicyDomain objects 812 can use, and is divided into different categories of information such as conditions 814, actions 816, policers 818, etc. As indicated by path 805 and as described further below, policy rules may comprise or contain conditions, actions, or policers.

REUSABLE-OBJECTS REPOSITORIES

Reusable objects in repository 804 can be referenced through DN type attributes by other entities of the QoS policy schema tree 800. For example, multiple policy rules 810 may contain references to the same condition 814 that resides in repository 804. A reference to a reusable object in repository 804 is not part of tree 800. Such references cross the structure of tree 800. Every reusable object has a unique name attribute, in order to establish a clear and unambiguous identity for objects. To accomplish name uniqueness, an implementation-specific schema enforces a relative distinguished name (RDN) type on the identified naming attributes for the reusable objects.

Using reusable objects has many benefits over use of "ad-hoc" instances. For example, using reusable objects ensures that minimal objects are required for loading. A Directory Information Tree (DIT) may define an object once and "use it" multiple times by referring to it from multiple entities.

Also, concepts that can be used as part of multiple conditions or multiple actions, such as constants, can be encapsulated in an object. This improves object reuse by separating the definition of the concept from the definition of the policy. For example, defining a constant with a well known name, such as "source port for web traffic" allows DIT constructors to define policies using that constant without knowing the real port number of web traffic in this domain. Improved data integrity is another advantage. Encapsulated concepts decouple changes to values of those concepts from changes to the policies that use them. For example, without encapsulation as defined above, changing one object value in one Policy Rule 810 affects all PolicyRules that it is contained in at once. Instead, if an object is used to encapsulate this value, then only the part of the PolicyRule that this object affects is changed.

Some object classes may be used to create reusable objects as well as non-reusable, "ad-hoc" instances. Such is the case with the qosPolicySimpleCondition class, for example. The class definition for such objects can't require a "must" status for the name attribute, because ad-hoc objects don't require it, and the requirement for name uniqueness can only be enforced by DIT constructors, not LDAP Server schema checking.

A reusable object may be more expensive than the use of an ad-hoc object when using directories because of the extra LDAP reference(s) involved in accessing a repository resident object. Reusable objects are constructed as follows.

1. A unique name, used as an RDN, is assigned to an instance of a reusable object.
2. The DN of the structural class representing the reusable object is added to the particular repository. The qosPolicyRoot object contains a DN reference to a repository container, of type PolicyGroup, containing up to 5 repositories of reusable-objects. Specific extensions of the QoS policy schema may add other type of repositories, as needed.

REPOSITORY STRUCTURE

FIG. 8B is a block diagram showing a summary view of the structure of reusable objects repository 804. All repository classes are derived from a class Policy of the Core Policy Schema 520, which has name, description and keywords attributes. Further, each repository has a specific internal structure that is described further below.

The presence of repositories 804 in the DIT is optional. The root object 802 of FIG. 8A may contain a DN attribute named Repositories that points to an instance of a qosPolicyRepositories class.

ATOMS

The QoS Policy Schema 530 provides a means for creating named variables and constants. Variables and constants collectively are called Atoms and are modeled by qosPolicyConstant and qosPolicyVariable classes. A variable consists of a name and a type. A constant consists of a name and a value. In the schema, values are tagged with data type.

A typical use of atoms is in forming conditional expressions that form parts of policies, such as objects instantiated from Condition class 814. For example, the Boolean expression 'SourceIPAddress==MyServerAddress' is composed from a variable of type IPAddress named 'SourceIPAddress', an operator '==' that denotes an equality logical relation and a constant of named 'MyServerAddress' that holds the IP address of a network device called MyServer.

An Implementation-Specific Schema 540 may also use Atoms for holding various named entities used as "system entities." For example, an implementation-specific schema may wish to introduce constants that are meaningful within the context of the schema, such as PhoneBookURL, HelpDeskSourcePort, CEOHostIP, etc.

An advantage of atoms is the ability to refer to a value by its name instead of copying the actual value every time it is used, thereby reducing the probability of errors and omissions arising from copying. The indirection provided by atoms also enhances central maintenance of widely used values. For example, if the IP address of the machine used by the CEO of an enterprise has changed, changing the value of the CEOHostIP constant accomplishes the change throughout the schema. All expressions referring to CEO-HostIP constants will reflect the change automatically.

Atoms are organized in named folders, thus providing multiple namespaces for constants and variables. As shown in FIG. 8B, a superclass qosPolicyAtomFolders 820 may be used to instantiate one or more atom folders 822. Each atom folder 822 contains a repository for variables and a repository for constants.

An implementation-specific schema 540 can create as many folders as it needs. For example, an implementation-specific schema can create folders for application parameters, one per application: OracleFinancialsParameters, CorporateIntranetSettings, SystemProperties, etc. The OracleFinancialsParameters folder may hold atoms such as TransactionType variable, OracleFinancialsURL constant, etc.

An individual named folder, such as qosPolicyAtomFolder 822, must contain a name (the FolderName attribute) and may contain up to two lists of DNs: one list for variables (as exemplified in FIG. 8B by qosPolicyVariables class 824) and one list for constants (as exemplified by qosPolicyConstants class 826). Because both qosPolicyVariable and qosPolicyConstants are auxiliary classes, they are not pointed to directly. To instantiate a variable (or a constant) and place it in the repository, the qosPolicyVariable class 824 or the qosPolicyConstant class 826 is attached to an instance of the PolicyInstance core class. This is a structural class used as a holder for the actual variable or constant. The DN of the instance of the PolicyInstance class holding the attached object is then added to the DN list of the folder qosPolicyVariables or qosPolicyInstance.

VALUES, CONSTANTS, VARIABLES

Values are modeled by an abstract class qosPolicyvalue. An instance of qosPolicyvalue contains actual data and a data type tag. Specific value types, such as integer, IP address, etc. are modeled by structural classes that are derived from qosPolicyValue. For example, the class qosPolicyNumberValue models a numeric value. Values are not reusable and are not named. Constants serve the same function as a reused value.

To use a value, an application creates an instance of the specific type value class and sets the data values. The derived value classes are auxiliary so they can be attached to the qosPolicyConstant class 826. This means that independent instances of value classes can not be created. For example, to represent the IP address of a workstation, an application creates an instance of qosPolicyIPAddressValue (which may have type $IP_{13}$ ADDRESS_DOT_NOTATION) and stores in it a string value that represents the IP address.

FIG. 8B shows class qosPolicyConstants 826 that may be used to instantiate constants. Constants are named values. The class qosPolicyConstant models a constant. Each constant has a name that is stored in an attribute qosPolicyConstantName. The constant's value may be referenced by a DN using an attribute qosPolicyValueRef or contain an actual value by attachment of an instance of the abstract class qosPolicyValue. To create a value, a derived auxiliary class that represents a specific value type is used, for example, qosPolicyNumberValue. In this document, the term qosPolicyValue is used collectively to represent any such derived auxiliary class.

Using constants, an application program may name and reuse values. For example, the number '80' is used for the port number of Web servers. A program may create a constant named WEBPort and attach the value '80' of type integer. The constant can be placed in a repository and can be referenced from conditions in many policy rules. An example of such a condition is 'SourcePort==WEBPort', where 'SourcePort' is a variable and WEBPort is a constant.

The variable class qosPolicyVariable models the concept of variable used in a conditional expression. For example, the condition 'MyNTStationAddress'=='144.254.256.256' uses a variable named MyNTStationAddress of type IP_ADDRESS, which is compatible with the type of the value '144.254.256.256'. The class qosPolicyVariable has two attributes, name (qosPolicyVariableName) and type (qosPolicyVariableType). Examples of variables and variable types are source port number of type Integer; Protocol number of type Integer or application name of type String; type Enumerated Value; and type IP Address.

Variables are bound to values in specific contexts. For example, when evaluating a simple condition, the Policy Decision Point or Policy Enforcement Point checks the type/value conformance rules for incompatibility. A violation of the conformance rules causes an error and prevents evaluation of the condition.

Variables may contain value constraints. A variable may contain a list of DNs pointing to constants (qosPolicyConstant) representing the allowed values it can be assigned. For example, a TransactionType variable in an OracleFinancialsParameters folder may contain value constraint constants UrgentQueryTX, GeneralLedgerTX, DBReplicationActivityTX, etc. The implementation-specific system can implement a logical value acceptation test of data entry by using the variable value constraint.

POLICERS

A policer is a software element that is attached to a filter or condition to define how to police or limit the set of flows that match that filter. The policer can contain such attributes as the aggregate maximum bandwidth allowed for these flows, the maximum bandwidth allowed for each single flows, number of flows allowed, special treatment to be applied to any excess traffic, such as re-mark packets with a different DSCP value, etc.

The schema 530 defines two categories of repositories for policers: DS policers and RSVP policers. A policer object that is in a reusable repository may be referenced by a qosPolicyRule object as described herein. A reusable policer may be either shared or private. A private policer is interpreted as effecting a single rule. A shared policer is interpreted as policing all rules referencing it.

To designate a policer as shared, set the value of the is shared attribute of that policer to truth-value TRUE. By default, policers are not shared. To modify a policer from being shared to being private, the value of the is-Shared attribute of that policer is set to FALSE.

For example, a DS policer DSP1 is a private reusable policer. It is used by rules R1, R2 and R3, i.e., referenced by the Diff-ServPolicer of qosPolicyDSPolicerAction objects associated with those rules. The excess burst limit set by this policer is 100 kbps. Because this is a private policer, the rules are interpreted to have excess burst limit of 100 kbps for each. For example, if DSP1 is designated as a shared policer, R1, R2 and R3 will share an excess burst limit of 100 kbps together.

Using a private reusable policer has the same effect as attaching three identical policers to each of the rules. Using a shared policer has the effect of policing three rules with one aggregate policer.

In one embodiment, the schema includes a repository of Differentiated Services (DS) policers. The repository may be a qosPolicyAggDSPolicerFolder object 828 and provides a grouping of aggregate service-level limits settings. A DS policer object 830 can be referenced by instances of the qosPolicyAction class. The schema may include a repository of RSVP policers in the form of a qosPolicyRSVPPolicer-Folder object 832. This repository provides a grouping of individual flow limits based on RSVP concepts. An RSVP policer object 834 can be referenced by instances of the qosPolicyAction class.

SIMPLE CONDITIONS

Policies may include conditional expressions ("simple conditions"). Simple conditions are Boolean expressions of the following form: {Variable; Operator; Value}. Simple conditions are used as building blocks for complex conditions. Complex conditions may include combinations of disjunctive simple condition lists, conjunctive simple condition lists and negations of individual simple conditions. Simple conditions are also used to provide optimized access for policies that are stored in a directory that contains a simple condition. Thus, a simple condition is a special type of PolicyRule that contains the condition embedded in the PolicyRule, rather than referencing another object that contains the condition.

As shown by FIG. 8B, conditions may be organized in a repository 804 using a condition folder object 836 that contains one or more policy conditions 838.

Simple conditions in the repository may be referenced by instances of class qosPolicy and qosSubPolicy. A class qosPolicySimpleCondition represents a simple condition. Placing an instance of class qosPolicySimpleCondition in the repository is carried out by attaching it to an instance of the PolicyInstance class. The qosPolicySimpleCondition class is an auxiliary class that is attached to a structural class to be instantiated. A DN of the PolicyInstance object is then added to the condition repository, thereby making the simple condition reusable by multiple policy rules.

POLICY TREE; POLICY RULES

FIG. 8C is a block diagram of a Policy tree structure. A Policy tree 840 is contained in a qosPolicyDomains object 842 and is represented by one or more QoSPolicyDomain objects 812. Thus, a Policy tree 840 may comprise one or more subtrees, and each subtree is a policy domain; each policy domain is modeled by the qosPolicyDomain class. There is no fixed location in the DIT where the policy objects are rooted and such location may be determined by the enterprise that owns or controls the DIT.

Policy definitions include one or more Policy Rules 850, partitioned into one or more distinct named containers such as QoSPolicyDomain object 812, under a higher-level container such as qosPolicyDomains object 842. As described further below, each Policy Rule, whether complex or simple, may contain a simple condition (or a list of simple conditions) and an action (or a list of actions). The simple conditions and actions used in composing policy rules can be either reusable objects that are stored in a repository, or instances of objects.

A policy domain belongs to one domain container. In one embodiment, each domain may contain a container, such as namedQoSPolicyContainer object 844, of qosPolicy objects. The container class models Roles and serves as a container of Policy Rules in the form of one or more qosPolicyRule objects 846.

In one embodiment, Policy Rules are grouped in named policy groups. A class qosPolicyNamedPolicyGroup, derived from the PolicyGroup core class, may form part of a policy tree as indicated by Named Policy Group object 848. Each named policy group belongs to one and only one domain object. Each named policy group object contains one or more Policy Rules in the form of qosPolicyRule objects 846. An auxiliary class PolicyRuleContainmentAux-Class may be used to attach the qosPolicyNamedPolicyGroup object to an instance of the qosPolicyRule object. A given qosPolicyRulebelongs to one and only one qosPolicyNamedPolicyGroup object.

A match strategy to be applied to the rules contained in this container is defined in a PolicyRuleMatchMethod attribute. This strategy is also used for rules added to the match process from global rules that apply to an entire policy domain.

A Policy rule is created using a qosPolicyRule object 846 and models an "atomic" policy unit and may be the final node in the QoS Policy hierarchy. However, some policies may contain one or more sub-policies that are also modeled by sub-policy objects that inherit properties from qosPolicyRule objects, as indicated by qosSubPolicy object 852. Containment of sub-policies is accomplished via attachment of rule container class (PolicyRuleContainmentAuxClass) to the qosPolicyRule.

Policy Rules that contain sub-policies are called complex policies. Policy Rules that have no sub-policies are called simple policies. A complex policy is a policy that is composed of other policies. An application program can determine whether a PolicyRule is simple or complex by testing the SubPolicies attribute of the PolicyRule. If the value of the attribute is not NULL, then the policy is complex. A given sub-policy can only be contained in a single policy.

Figure 8D:
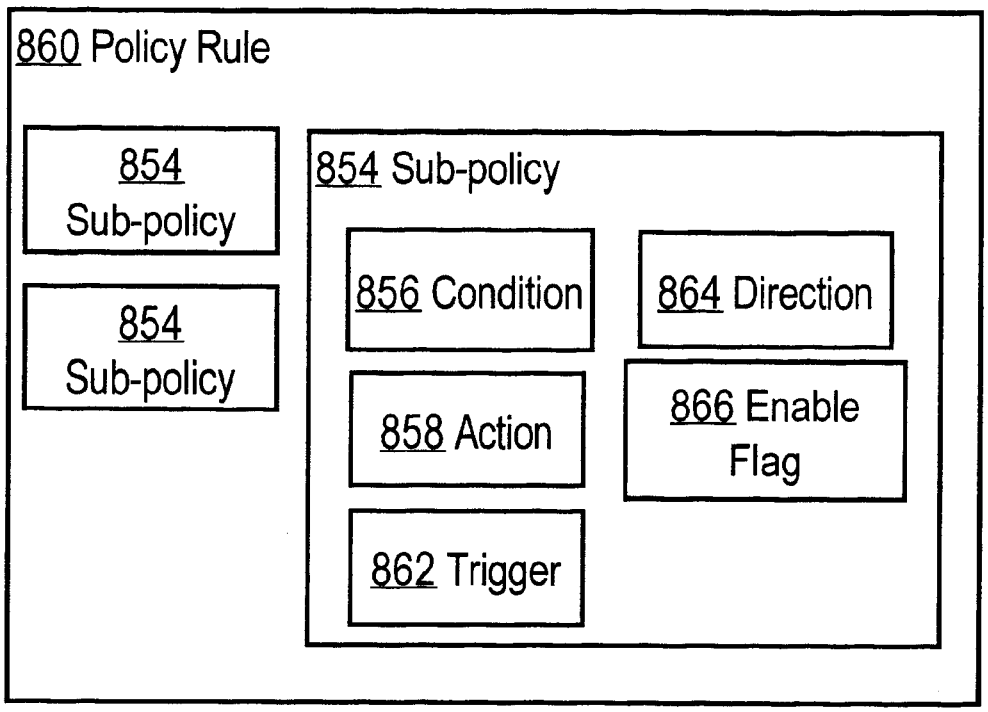
FIG. 8D is a block diagram of the structure of a policy rule.
Figure 8D:
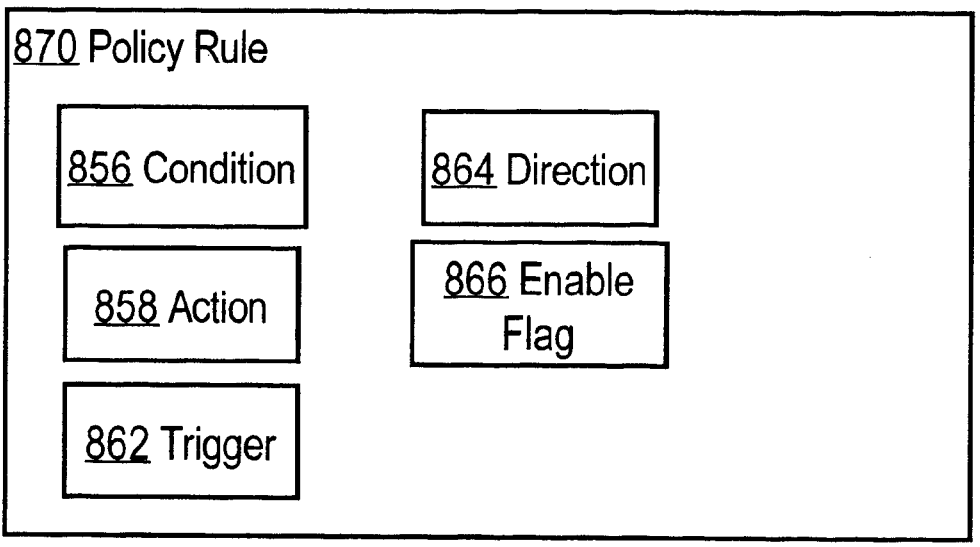

FIG. 8D is a block diagram of the structure of two exemplary policy rules 860, 870. A first policy rule 860 comprises a plurality of sub-policies 854, whereas a second 1 5 policy rule 870 has no sub-policies. Each policy or sub-policy may comprise a Condition 856, Action 858, Trigger 862, Direction value 864, and Enable Flag value 866. In one embodiment, each policy rule is implemented in a qosPolicyRule class that has the Direction attribute and the attribute it inherits from the PolicyRule Core class. The Trigger attribute 862 is a DN reference to a trigger object. A trigger specifies an event such as a time event or network load. For example, specifying a time trigger for a policy means that the policy rule will only be enabled for a specific time frame. Interpretation of a policy rule for a given network flow is expressed in the statement: "If the rule is enabled (EnableFlag=TRUE), and the flow direction is as specified in Direction and the Condition evaluated to TRUE, then use the Action to extract the prescribed treatment for this flow."

The interpretation of a policy that contains sub-policies is as follows: If the value of the Enable Flag attribute (inherited from the Core class PolicyRule) of the "parent" policy is FALSE, then all sub-policies of this rule are disabled (ignored). Otherwise, each sub-policy is designated enabled/disabled by the value of its own Enable Flag attribute.

A Policy is evaluated as if no sub-policies exist. SubPolicies are evaluated in the following way:

1. SubPolicies' triggers are AND-ed with the policy triggers.
2. SubPolicies' condition list is AND-ed with the policy's condition. The complex Boolean expression is built from the Policy complex condition AND the subpolicy complex condition.

SIMPLE AND COMPLEX CONDITIONS

Simple and complex conditions are used for determining if a certain PolicyRule applies to a given network flow. If the condition's expression evaluates to TRUE, then the PolicyRule applies and the actions specified are taken. Conditions in PolicyRules, from a networking perspective, are also known as Filters. Filters are not modeled directly in either the QoS Policy Schema or the core schema; no Filter class is defined. However, the filter concept is important to the QoS Policy data model and is manifested in the schema as relationships between a policy rule and a structured list of groups of simple conditions.

Simple conditions are the building blocks of complex conditions, and may also be used directly by Policy Rules. A class qosPolicySimpleCondition models a simple Boolean expression of the form {variable; logical relation; value}. For example, the Boolean expression 'SourcePort== WEBServerPort') is modeled as a simple condition that contains the variable SourcePort, the '==' logical relation and the constant named WEBServerPort and a value of the constant.

Simple condition composition enforces type conformance rules. First, the data type of the variable must be compatible with the data type of the constant. Second, the logical relation must be compatible with the data type of the variable and the constant. The schema does not model conformance rules, but the conformance rules are an integral part of the information model and must be enforced by DIT constructors and/or consumers. For example, if the conformance rules are not enforced by the data entry agent, then a PDP will verify conformance when reading the DIT.

The schema defines multiple to compose a simple condition through the combination of representations of variables, constants and values. To facilitate this, the classes qosPolicyVariable, qosPolicyConstant and qosPolicyValue are all auxiliary classes. Therefore, combinations of representation by DN references and attachments are possible.

In Variable representation, the class qosPolicyVariable may be directly attached to the qosPolicySimpleCondition instance. Alternatively, the class qosPolicyVariable may be attached to an instance of the PolicyInstance class, which may then be referenced by a D.N. from the qosPolicySimpleCondition instance.

In Value representation, the qosPolicyValue class may be directly attached to the qosPolicySimpleCondition class. Alternatively, the qosPolicyValue class may be attached to an instance of the PolicyInstance class, which may then be referenced by a D.N. from the qosPolicySimpleCondition instance. In another alternative, the qosPolicyConstant class may be directly attached to the qosPolicySimpleCondition class. In still another alternative, the class qosPolicyConstant may be attached to an instance of the PolicyInstance class, which may then be referenced by a DN from an instance of the class qosPolicySimpleCondition.

Simple conditions are modeled by an auxiliary class and can not be directly instantiated. There are two ways to instantiate a simple condition, by attachment and by an indirect DN. In attachment, a qosPolicySimpleCondition class can be attached to the qosPolicyRule class. In indirect DN, a qosPolicySimpleCondition class may be attached to an instance of the PolicyInstance structural class, and then referenced through the policyRuleConditionList attribute of PolicyRule.

The schema enables reusing simple conditions by placing them in a common repository. In order for a simple condition to be a member of a repository, it must be of the second kind (indirect DN) and must also carry a name (RDN type).

In most cases, a simple condition is sufficient for the definition of a condition for a QosPolicyRule. A simple condition can be added to a policy rule (qospolicy) by direct attachment or by reuse. In direct attachment, an instance of the simple condition is attached to the qospolicy instance, thereby creating an ad-hoc simple condition or private simple condition. This instance of the condition can't be referenced by any other policy rule. In reuse, the simple condition list attribute policyRuleConditionList (derived from PolicyRule) is used to point to a repository-resident simple condition. Such a reusable simple condition can be shared by multiple policy rules.

Ad-hoc simple filters are highly efficient. They can be accessed with a single LDAP operation. Reusable simple filters are highly flexible, but require more than a single LDAP operation.

A Complex condition consists of groups of simple conditions that are either logically ANDed or ORed, and special markings negating given simple conditions in the complex condition, (e.g.: 'NOT (SourceIP=1.1.1.0)'). A complex condition is modeled by two attributes. A PolicyRuleConditionListType attribute stores a Boolean expression type. A Structured DN syntax attribute points to a list of simple conditions that are used to define the Boolean expression; the conditions are combined using syntax elements contained in the DN itself.

The structured DN (SDN) syntax facilitates arbitrary logical relationships among simple conditions. SDN syntax and semantics are discussed in J. Strassner, E. Ellesson, B. Moore, "Policy Framework Core Information Model", draft-ietf-policy-core-info-model-00.txt. SDNs may point to repository-resident simple conditions or ad-hoc simple conditions. Simple conditions that are referenced by a DN must be attached to an instance of the PolicyInstance class, as the qosPolicySimpleCondition is an auxiliary class and can't be directly instantiated.

Complex conditions are composed from simple conditions that are indirectly instantiated through DN pointers to the objects. However, simple conditions comprising complex conditions need not all be reusable.

ACTION

Three different PolicyAction classes define actions to be applied to the flow that meets the PolicyRule's conditions. These objects may be used together. The three types of actions are viewed as the most common and general actions for QoS applications. Additional actions may be provided. In a preferred embodiment, the actions comprise Coloring of DSCP values; Diff-Serv Policers; and Int-Serv Policers for RSVP.

METHOD OF USE

Figure 8E:
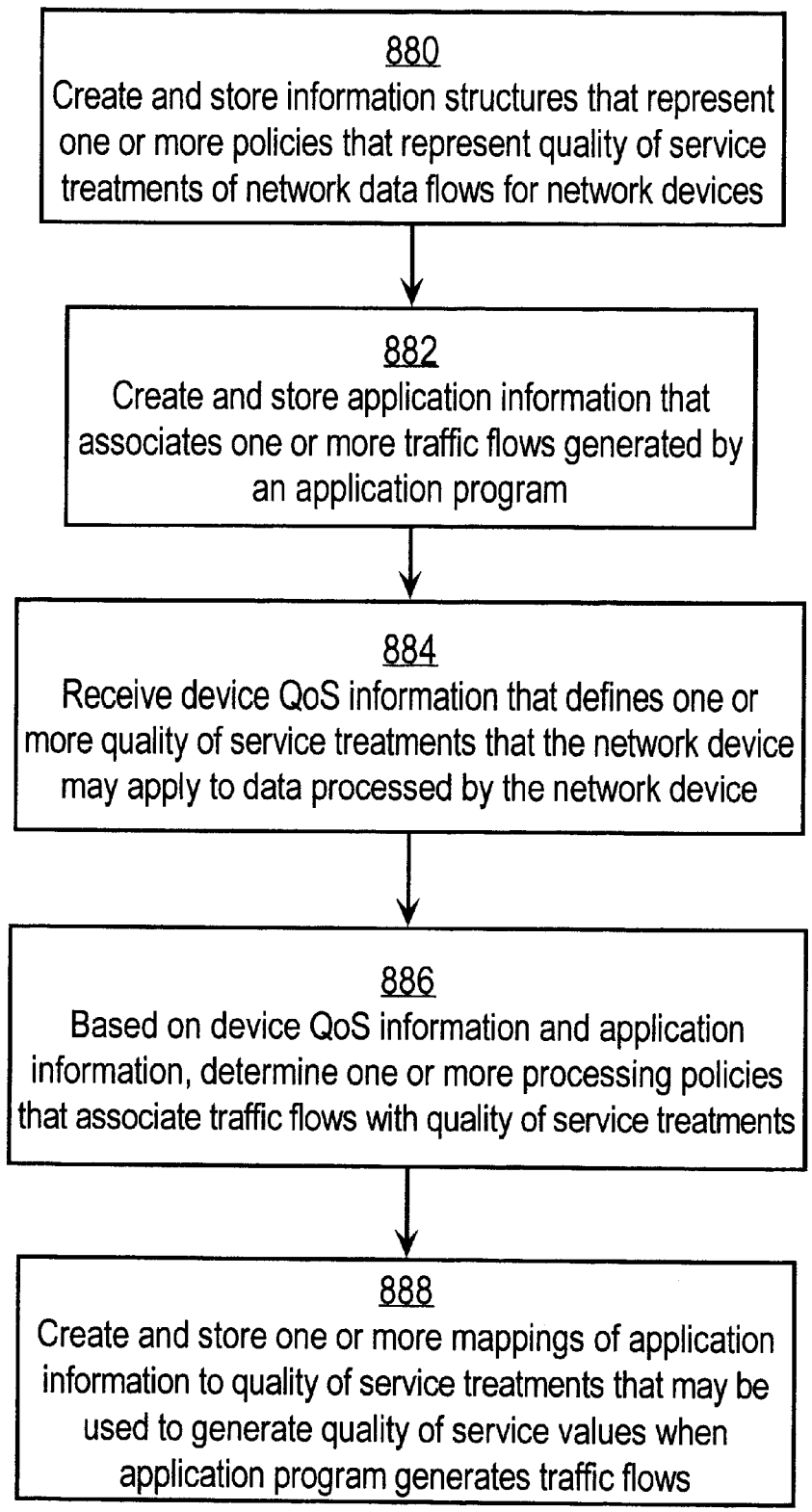
FIG. 8E is a flow diagram of a method of processing policy information using a tree structured information model.

FIG. 8E is a flow diagram of an embodiment of a method of processing policy information using information structures as disclosed herein. The method of FIG. 8E may be implemented in the form of one or more computer programs that form part of, or are executed by, Policy Server 604 or Application QoS Policy Element 609 of FIG. 6B.

In block 880, information structures representing one or more of the policies representing quality of service treatments of network data flows for network devices are created and stored. Block 880 may involve creating and storing, in a memory device associated with Policy Server 604 of Application QoS Policy Element 609, a QoS Policy Schema 530 of the type described herein.

In block 882, information that associates one or more traffic flows generated by an application program is created and stored. The information may include information identifying one or more points at which an application generates the traffic flows. For example, block 880 may involve registering and storing ACPs of an application in a repository in the manner described above in connection with FIG. 7A.

In block 884, device QoS information that defines one of more quality of service treatments that the network device may apply to data processed by the network device is received. Block 884 may involve obtaining information from network devices that defines the quality of service capabilities or features of the devices. This can be carried out through device discovery or use of configuration files.

In block 886, based on the device QoS information and the application information, one or more processing policies that associate the traffic flows with the quality of service treatments are determined. Block 886 may involve setting policies in the manner described above in connection with block 704 and block 706 of FIG. 7A.

In block 888, one or more mappings of the application information to the quality of service treatments that may be used to generate the quality of service value when the application program generates traffic flows are created and stored. Block 888 may involve the steps described above in connection with FIG. 7B.

As a result, quality of services treatments for network devices and network data flows are established based on information stored in a flexible information model.

IMPLEMENTING A POLICY SCHEMA IN A DIRECTORY SERVER

Details of how to implement a policy schema in a directory server are now presented. For purposes illustrating an example, the directory server is assumed to be an LDAP server.

USE OF DISTINGUISHED NAME IN THE SCHEMA

Distinguished names are object primary keys in LDAP. The QoS Policy Schema uses DNs in various places according to the concepts defined in the Core Schema. Major uses of DNs include:

1. Object containers—throughout the schema, the relationships of a container to the set of objects that it contains are prevalent. Containers are lists of DNs of contained objects. A container may be attached to a node on the tree, thus adding another level to the hierarchy.
2. Static branches—tree leaves are sometimes pointed to by DNs.
3. Cross hierarchy reference—references from a given entity to another, such as in repository objects by means of DN.

QOS POLICY AUXILIARY CLASSES

Preferably, reusable objects are stored in the repositories and are referred to by DNs. Objects that are not reusable should, if possible, be attached to other classes for efficiency. Attachment allows a more efficient LDAP data retrieval operation.

Attaching more then one auxiliary class to a single structural object is allowed. This type of usage is recommended when defining simple policy rules that include the condition and action in the policy rule entry. Attaching the condition, its variable, and a value, the action and its policers, allows retrieval of the entire policy rule in a single LDAP operation.

Objects of auxiliary type are attached to a structural class to be instantiated. There are 3 ways of using these objects. First, an application program can attach an object of auxiliary type to a PolicyInstance class. Whenever an auxiliary class should be instantiated so that it can be reused, it will be attached to a PolicyInstance object. An example would be a reusable qosPolicySimpleCondition to be placed in the Repository. The actual object placed there would be a PolicyInstance with a qosPolicySimpleCondition attached to it.

Second, an application program can attach specific containers to root objects. Some auxiliary classes are attached to the appropriate structural classes defined in the Core Policy Information Model and Schema. Among such classes are the PolicyGroupContainmentAuxClass, which is used to attach qosPolicyDomain objects to, for example, other qosPolicyDomain, QosPolicyRule, or qosNamedPolicyContainer objects. Each of these classes can contain any of the other classes by using the PolicyRuleContainmentAuxClass to contain the DN of the appropriate class.

Third, a program can attach to an object for efficient LDAP retrieval operation. For example, a qosPolicySimpleCondition object can be attached to a qosPolicy object. A simple QoS policy rule that includes just a single condition and action should be built by attaching the qosPolicySimpleCondition to the qosPolicyRule object. In this case, the qosPolicyRule.policyRuleConditionList attribute will be NULL.

As another example, a qosPolicyAction object may be attached to a qosPolicy object. A simple policy rule that includes just a single conditions and action should be built by attaching the qosPolicyAction to the qosPolicy object. In this case the qosPolicy.policyRuleActionList attribute will not appear. The same mechanism will be used for attaching PolicyTrigger objects.

In addition, a program may attach a qosPolicyVariable object, qosPolicyConstant object and qosPolicyValue objects to a qosPolicySimpleCondition object. For a complex policy rule, it is recommended that a QosPolicySimpleCondition object be constructed by attachment of qosPolicyVariable, qosPolicyConstant and qosPolicyValue auxiliary classes. The only exception to this rule is when one of these object is a reusable (e.g., resident in a repository) object. In this case it should not be attached, but a DN reference should be used instead.

DATA INTEGRITY

LDAP provides little if any support for data integrity protection. The only data integrity guarantee provided by LDAP is that a single object instance access is atomic. Accordingly, complex schemata such as the qosPolicy schema cannot guarantee that multi-step operations are atomic. No read consistency is guaranteed. While there are various solutions to this problem, a general schema may not rely on any particular directory product guarantees that are beyond the LDAP protocol standard specification.

One way to address the data integrity issue is to control the order of insertion of objects into the directory server. Objects should be placed in the directory server in a particular order to minimize risks of lost updates due to client or server abnormal termination. In general, referred objects should be placed in the DIT prior to the placement of its DN in the referring object. For example, an action object such as a qosPolicyAction object should be fully initialized and placed in the DIT before its DN is added to the ActionList attribute of the policy rule of a PolicyRule object.

Using the opposite order, namely, inserting a DN of a qosPolicyAction instance in the ActionList before placing the action object in the DIT, may result in a "dangling" DN. This may happen if the client machine crashes before the second operation completes successfully.

There is a tradeoff for using such safe insertion ordering tactics. For example, assume that the referring and referred objects are to be placed in the directory so the referring object is the parent of the referred object. No child DN exists before the parent is placed in the DIT. In such a case, if a program writes the parent, thus creating the node in the DIT and then writes the child, an abnormal termination of either client or LDAP server before the operation of placing the child results in a dangling child DN reference in the parent. To prevent this, the program must carry out an extra write operation: First, the parent is written with no reference to the child. Next, the child is written to the correct DIT placement. Finally, the parent is modified to point to the child.

A second way to address the data integrity issue involves distinguishing between objects in the repository to private instantiations. Reusable objects will only be instantiated in the repository part of the DIT. Data integrity of the DIT relies on the location of the objects. When a change is made to a reusable object, located in the repository, no other action is required to insure that the modification is reflected in all referring objects and policies. If a reusable object is not placed in the repository, each change made to that object requires a complete scan of the DIT to make the change to each copy.

A third way to address data integrity is versioning of objects. Adding meta information to objects, such as creation or modification time, version and other application-specific information will allow implementation of application-specific data integrity checking and enforcement.

An issue related to data integrity involves DNs of referred objects. When updating a DN to a referred object, that object version should be checked to make sure that it exists and the object is of the right version. Schema checking should be turned on in the directory server.

EXTENDING THE QOS POLICY SCHEMA

An Implementation-Specific Schema 540 may be created based upon the QoS Policy Schema by deriving specific classes.

The qosPolicyValue class and the classes derived from it describe common value types such as Integer, String, and IP address. When other specific types are required, such as float or MAC address, the required class is from qosPolicyValue and an attribute of the required value is added. If possible, the attribute name should be qosPolicyValue. The Type of the value should be well defined and standard for interoperability.

The qosPolicySimpleCondition object represents a Policy condition, which describes one Boolean condition. For Boolean conditions that are not structured as <variable-relation-value>, a new type of condition class should be added. An example would be an unary condition. Subclassing could either be from the PolicyCondition class (Core) or the qosPolicySimpleCondition class.

Actions are represented by the qosPolicyAction class, and as defined in the QoS Policy Schema, the qosPolicyAction class includes three (3) actions. To add other actions to a certain qosPolicy or qosSubPolicy, additional actions should be added to the qosPolicyAction class by deriving this class and adding the required attributes.

HARDWARE OVERVIEW

Figure 9:
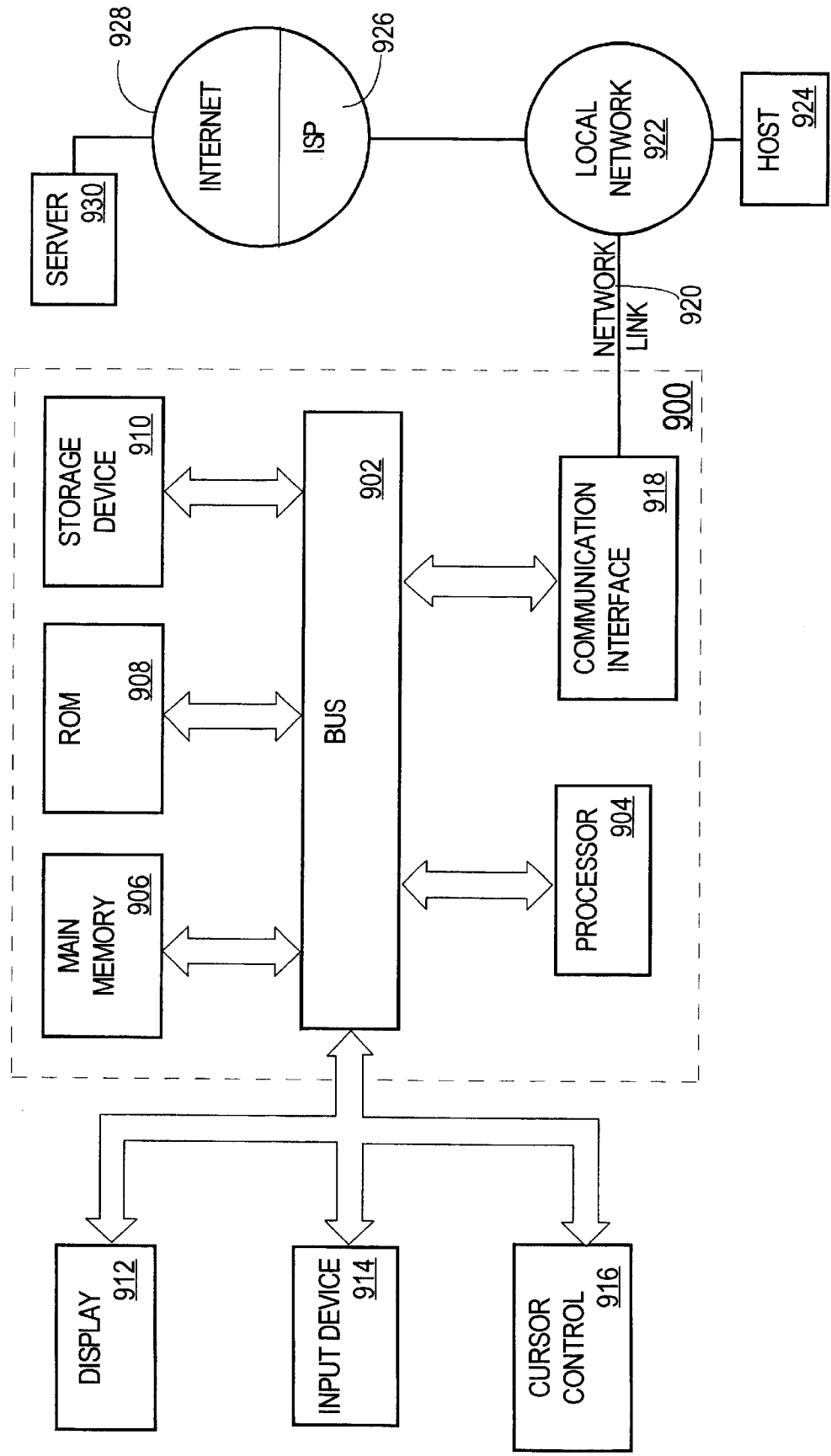
FIG. 9 is a block diagram of a computer system with which an embodiment may be carried out.

FIG. 9 is a block diagram that illustrates a computer system 900 upon which an embodiment of the invention may be implemented. Computer system 900 includes a bus 902 or other communication mechanism for communicating information, and a processor 904 coupled with bus 902 for processing information. Computer system 900 also includes a main memory 906, such as a random access memory (RAM) or other dynamic storage device, coupled to bus 902 for storing information and instructions to be executed by processor 904. Main memory 906 also may be used for storing temporary variables or other intermediate information during execution of instructions to be executed by processor 904. Computer system 900 further includes a read only memory (ROM) 908 or other static storage device coupled to bus 902 for storing static information and instructions for processor 904. A storage device 910, such as a magnetic disk or optical disk, is provided and coupled to bus 902 for storing information and instructions.

Computer system 900 may be coupled via bus 902 to a display 912, such as a cathode ray tube (CRT), for displaying information to a computer user. An input device 914, including alphanumeric and other keys, is coupled to bus 902 for communicating information and command selections to processor 904. Another type of user input device is cursor control 916, such as a mouse, a trackball, or cursor direction keys for communicating direction information and command selections to processor 904 and for controlling cursor movement on display 912. This input device typically has two degrees of freedom in two axes, a first axis (e.g., x) and a second axis (e.g., y), that allows the device to specify positions in a plane.

The invention is related to the use of computer system 900 for creating policies for use in policy-based management of quality of service treatments of network data traffic flows. According to one embodiment of the invention, creating policies for use in policy-based management of quality of service treatments of network data traffic flows is provided by computer system 900 in response to processor 904 executing one or more sequences of one or more instructions contained in main memory 906. Such instructions may be read into main memory 906 from another computer-readable medium, such as storage device 910. Execution of the sequences of instructions contained in main memory 906 causes processor 904 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 904 for execution. Such a medium may take many forms, including but not limited to, non-volatile media, volatile media, and transmission media. Non-volatile media includes, for example, optical or magnetic disks, such as storage device 910. Volatile media includes dynamic memory, such as main memory 906. Transmission media includes coaxial cables, copper wire and fiber optics, including the wires that comprise bus 902. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 904 for execution. For example, the instructions may initially be carried on a magnetic disk of a remote computer. The remote computer can load the instructions into its dynamic memory and send the instructions over a telephone line using a modem. A modem local to computer system 900 can receive the data on the telephone line and use an infra-red transmitter to convert the data to an infra-red signal. An infra-red detector can receive the data carried in the infra-red signal and appropriate circuitry can place the data on bus 902. Bus 902 carries the data to main memory 906, from which processor 904 retrieves and executes the instructions. The instructions received by main memory 906 may optionally be stored on storage device 910 either before or after execution by processor 904.

Computer system 900 also includes a communication interface 918 coupled to bus 902. Communication interface 918 provides a two-way data communication coupling to a network link 920 that is connected to a local network 922. For example, communication interface 918 may be an integrated services digital network (ISDN) card or a modem to provide a data communication connection to a corresponding type of telephone line. As another example, communication interface 918 may be a local area network (LAN) card to provide a data communication connection to a compatible LAN. Wireless links may also be implemented. In any such implementation, communication interface 918 sends and receives electrical, electromagnetic or optical signals that carry digital data streams representing various types of information.

Network link 920 typically provides data communication through one or more networks to other data devices. For example, network link 920 may provide a connection through local network 922 to a host computer 924 or to data equipment operated by an Internet Service Provider (ISP) 926. ISP 926 in turn provides data communication services through the world wide packet data communication network now commonly referred to as the "Internet" 928. Local network 922 and Internet 928 both use electrical, electromagnetic or optical signals that carry digital data streams. The signals through the various networks and the signals on network link 920 and through communication interface 918, which carry the digital data to and from computer system 900, are exemplary forms of carrier waves transporting the information.

Computer system 900 can send messages and receive data, including program code, through the network(s), network link 920 and communication interface 918. In the Internet example, a server 930 might transmit a requested code for an application program through Internet 928, ISP 926, local network 922 and communication interface 918. In accordance with the invention, one such downloaded application provides for creating policies for use in policy-based management of quality of service treatments of network data traffic flows as described herein.

The received code may be executed by processor 904 as it is received, and/or stored in storage device 910, or other non-volatile storage for later execution. In this manner, computer system 900 may obtain application code in the form of a carrier wave.

Accordingly, a complete information model in the form of a directory schema has been disclosed that may be used to store representations of abstract policies that govern quality of service treatments of network data flows.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method of integrating a network with policies representing quality of service treatments of network data flows for network devices, comprising the steps of:

creating and storing information structures representing one or more of the policies representing quality of service treatments of network data flows for network devices;

creating and storing application information that associates one or more traffic flows generated by an application program, including information identifying one or more points at which an application generates the traffic flows;

receiving device QoS information that defines one or more quality of service treatments that the network device may apply to data processed by the network device;

based on the device QoS information and the application information, determining one or more processing policies that associate the traffic flows with the quality of service treatments;

creating and storing one or more mappings of the application information to the quality of service treatments that may be used to generate the quality of service value when the application program generates traffic flows.

2. A method as recited in claim 1, wherein the step of creating and storing information structures comprises the steps of:

creating and storing one or more policy trees, each policy tree comprising one or more policy domains and one or more repositories, each policy domain comprising one or more policy rules that reference one or more conditions and actions that are defined in the repositories and that represent one or more of the policies representing quality of service treatments of network data flows for network devices.

3. A method as recited in claim 2, wherein enforcing one of the processing policies comprises:

requesting an operating system function to modify a packet of the traffic flows using a policy element that requests a different operating system function according to the operating system then in use;

at the network device, in response to receiving traffic from the application program that matches the traffic flow type and in response to the operating system function, modifying the packet to activate a quality of service treatment of the network device.

4. A method as recited in claim 1, wherein the step of creating and storing information structures comprises the steps of:

creating and storing one or more policy trees, each policy tree comprising one or more policy domains and one or more repositories, each policy domain comprising one or more policy rules that reference one or more conditions, actions and policers that are defined in the repositories and that represent one or more of the policies representing quality of service treatments of network data flows for network devices, and wherein each of the policers represents a flow limit on one or more of the network data flows.

5. A method as recited in claim 1, wherein the step of creating and storing information structures comprises the steps of:

creating and storing one or more policy trees, each policy tree comprising one or more policy domains and one or more repositories, each policy domain comprising one or more policy rules that reference one or more conditions and actions that are defined in the repositories and that represent one or more of the policies representing quality of service treatments of network data flows for network devices;

creating and storing one or more definitions of variables and constants in at least one of the repositories.

6. A method as recited in claim 1, wherein the step of creating and storing information structures comprises the steps of:

creating and storing one or more policy trees, each policy tree comprising one or more policy domains and one or more repositories, each policy domain comprising one or more policy rules that reference one or more conditions and actions that are defined in the repositories and that represent one or more of the policies representing quality of service treatments of network data flows for network devices;

creating and storing one or more sub-policy objects associated with one of the policies in one of the policy domains, wherein each sub-policy object comprises at least one condition, action, and trigger.

7. A method as recited in claim 1, further comprising:

storing the mappings in a repository that is accessible by the application program;

converting the mappings into one or more settings of the network device;

enforcing one of the processing policies at the network device in response to receiving traffic from the application program that matches the traffic flow type.

8. A method as recited in claim 1, further comprising:

creating and storing one or more classes that classify the traffic flows, each of the classes comprising one or more types of traffic flows;

based on the device QoS information and the classes of the traffic flows, determining one or more processing policies that associate the traffic flows with the quality of service treatments.

9. A method as recited in claim 1, wherein receiving application information comprises receiving one or more application code points that represent traffic flow types.

10. A method as recited in claim 1, wherein receiving application information comprises receiving one or more differentiated services codes that represent traffic flow types.

11. A method as recited in claim 1, wherein creating and storing one or more mappings comprises creating and storing one or more policies, concerning network processing of traffic flows generated by the application program, in the repository.

12. A method as recited in claim 1, wherein creating and storing one or more mappings comprises creating and storing one or more policies, concerning network processing of traffic flows generated by the application program, in a policy store that is coupled to the repository.

13. A method as recited in claim 1, wherein creating and storing one or more mappings comprises creating and storing one or more policies, concerning network processing of traffic flows generated by the application program, in a directory.

14. A method as recited in claim 1, wherein creating and storing one or more mappings comprises creating and storing one or more policies, concerning network processing of traffic flows generated by the application program, in a policy server coupled to a Lightweight Directory Access Protocol directory that comprises the repository.

15. A method as recited in claim 1, wherein creating and storing one or more mappings further comprises creating and storing, in the repository, one or more mappings of Application Code Points of the application program to one or more Differentiated Services Code Points of a protocol associated with the network device.

16. A method as recited in claim 1, wherein creating and storing one or more mappings further comprises generating one or more messages in RSVP+ and communicating the messages to the network device.

17. A method as recited in claim 1, wherein receiving application information comprises receiving application information that defines one or more traffic flows generated by an application program, including information identifying one or more points at which an application generates the traffic flows, from a first individual having responsibility for managing enterprise applications in the network.

18. A method as recited in claim 1, wherein receiving device QoS information comprises receiving device QoS information that defines one of more quality of service treatments that the network device may apply to data processed by the network device, from a second individual having responsibility for managing the network.

19. A method as recited in claim 1, wherein determining one or more processing policies comprises creating and storing one or more policy statements in a repository, wherein each policy statement associates a condition of one of the traffic flows, an operator, an operand, and an action comprising one of the quality of service treatments.

20. A method as recited in claim 1, wherein determining one or more processing policies comprises creating and storing one or more policy statements in a repository, wherein each policy statement is represented by a plurality of nodes that represent a condition of one of the traffic flows, an operator, an operand, and an action comprising one of the quality of service treatments.

21. A method as recited in claim 1, wherein determining one or more processing policies comprises creating and storing one or more policy statements in a directory, wherein each policy statement is represented by a plurality of nodes that represent a condition of one of the traffic flows, an operator, an operand, and an action comprising one of the quality of service treatments, and wherein the plurality of nodes is coupled to a root node having a distinguished name in the directory.

22. A method as recited in claim 1, wherein each of the mappings comprises an application code point value stored in associated with a differentiated services code point value.

23. A method of selectively establishing a quality of service value for a network device, comprising the steps of:

receiving application information that defines one or more traffic flows generated by an application program, including information identifying one or more points at which an application generates the traffic flows, from a first individual having responsibility for managing enterprise applications in the network;

receiving device QoS information that defines one or more quality of service treatments that the network device may apply to data processed by the network device, from a second individual having responsibility for managing the network;

based on the device QoS information and the application information, determining one or more processing policies that associate the traffic flows with the quality of service treatments;

creating and storing one or more mappings of the application information to the quality of service treatments that may be used to generate the quality of service value when the application program generates traffic flows.

24. A method as recited in claim 23, further comprising:

storing the mappings in a repository that is accessible by the application program;

converting the mappings into one or more settings of the network device;

enforcing one of the processing policies at the network device in response to receiving traffic from the application program that matches the traffic flow type.

25. A computer-readable medium having recorded thereon one or more sequences of instructions for integrating a network with policies representing quality of service treatments of network data flows for network devices, wherein execution of the one or more sequences of instructions by one or more processors causes the one or more processors to perform the steps of:

creating and storing information structures representing one or more of the policies representing quality of service treatments of network data flows for network devices;

creating and storing application information that associates one or more traffic flows generated by an application program, including information identifying one or more points at which an application generates the traffic flows;

receiving device QoS information that defines one or more quality of service treatments that the network device may apply to data processed by the network device;

based on the device QoS information and the application information, determining one or more processing policies that associate the traffic flows with the quality of service treatments;

creating and storing one or more mappings of the application information to the quality of service treatments that may be used to generate the quality of service value when the application program generates traffic flows.

26. A computer-readable medium as recited in claim 25, wherein the step of creating and storing information structures comprises:

creating and storing one or more policy trees, each policy tree comprising one or more policy domains and one or more repositories, each policy domain comprising one or more policy rules that reference one or more conditions and actions that are defined in the repositories and that represent one or more of the policies representing quality of service treatments of network data flows for network devices.

27. A computer-readable medium as recited in claim 25, wherein creating and storing information structures comprises:

creating and storing one or more policy trees, each policy tree comprising one or more policy domains and one or more repositories, each policy domain comprising one or more policy rules that reference one or more conditions, actions and policers that are defined in the repositories and that represent one or more of the policies representing quality of service treatments of network data flows for network devices, and wherein each of the policers represents a flow limit on one of the network data flows.

28. A computer-readable medium as recited in claim 25, wherein the step of creating and storing information structures comprises:

creating and storing one or more policy trees, each policy tree comprising one or more policy domains and one or more repositories, each policy domain comprising one or more policy rules that reference one or more conditions and actions that are defined in the repositories and that represent one or more of the policies representing quality of service treatments of network data flows for network devices;

creating and storing one or more definitions of variables and constants in at least one of the repositories.

29. A computer-readable medium as recited in claim 25, wherein the step of creating and storing information structures comprises the steps of:

creating and storing one or more policy trees, each policy tree comprising one or more policy domains and one or more repositories, each policy domain comprising one or more policy rules that reference one or more conditions and actions that are defined in the repositories and that represent one or more of the policies representing quality of service treatments of network data flows for network devices;

creating and storing one or more sub-policy objects associated with one of the policies in one of the policy domains, wherein each sub-policy object comprises at least one condition, action, and trigger.

* * * * *